(12) United States Patent
Yonge, III et al.

(10) Patent No.: US 8,681,883 B2
(45) Date of Patent: Mar. 25, 2014

(54) COMMUNICATING OVER POWERLINE MEDIA USING SPOT BEAMFORMING

(75) Inventors: Lawrence W. Yonge, III, Summerfield, FL (US); Arun Avudainayagam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/523,594

(22) Filed: Jun. 14, 2012

(65) Prior Publication Data

US 2013/0163684 A1 Jun. 27, 2013

Related U.S. Application Data

(60) Provisional application No. 61/497,425, filed on Jun. 15, 2011.

(51) Int. Cl.
*H04B 3/00* (2006.01)

(52) U.S. Cl.
USPC ........... 375/257; 375/295; 375/259; 375/260; 375/267; 375/299; 375/285; 375/296

(58) Field of Classification Search
USPC ......... 375/295, 257, 259, 260, 267, 299, 285, 375/296
See application file for complete search history.

(56) References Cited

U.S. PATENT DOCUMENTS

| 7,551,907 | B2 | 6/2009 | French et al. |
| 7,804,917 | B2 | 9/2010 | French et al. |
| 2008/0080634 | A1 | 4/2008 | Kotecha et al. |
| 2010/0202553 | A1 | 8/2010 | Kotecha et al. |
| 2010/0224725 | A1 | 9/2010 | Perlman et al. |
| 2010/0248729 | A1 | 9/2010 | Yu et al. |
| 2010/0273495 | A1 | 10/2010 | Onggosanusi et al. |
| 2013/0003788 | A1 | 1/2013 | Marinier et al. |
| 2013/0058296 | A1 | 3/2013 | Jitsukawa |

FOREIGN PATENT DOCUMENTS

| EP | 1763146 A1 | 3/2007 |
| WO | WO 2008135982 A2 | 11/2008 |
| WO | WO 2011001430 A2 | 1/2011 |
| WO | 2012174456 | 12/2012 |

OTHER PUBLICATIONS

Hashmat R., et al., "MIMO comunications for inhome PLC networks: Measurements and results up to 100 MHz", Power Line Communications and Its Applications (ISPLC), 2010 IEEE International Symposium on, IEEE, Piscataway, NJ, USA, Mar. 28, 2010, pp. 120-124, XP031686433, ISBN: 978-1-4244-5009-1.
International Search Report and Written Opinion—PCT/US2012/042784—ISA/EPO—Oct. 1, 2012.

(Continued)

*Primary Examiner* — Siu Lee
(74) *Attorney, Agent, or Firm* — DeLizio Gilliam, PLLC

(57) ABSTRACT

A system and method for communicating information through a powerline medium including at least three conductors, where the transmitter transmits at least two signals onto the powerline medium and the receiver receives one or more signals from the powerline medium. The transmitter adjusts the power transmitted into the powerline medium in order to set the adjusted transmit power to a predetermined level, e.g., a level that ensures power radiated from the powerline medium does not exceed a regulatory limit. The process of adjusting the transmit power may take into account a functional relationship between the transmitted power and properties of the channel.

20 Claims, 16 Drawing Sheets

(56) References Cited

OTHER PUBLICATIONS

Schneider D., et al., "Implementation and results of a MIMO PLC feasibility study", Power Line Communications and Its Applications (ISPLC), 2011 IEEE International Symposium on, IEEE, Apr. 3, 2011, pp. 54-59, XP031864653, DOI: 10.1109/ISPLC.2011.5764450 ISBN: 978-1-4244-7751-7.

Schneider D., et al., "Precoded Spatial Multiplexing MIMO for Inhome Power Line Communications", Global Telecommunications Conference, 2008. IEEE Globecom 2008. IEEE, IEEE, Piscataway, NJ, USA, Nov. 30, 2008, pp. 1-5, XP031370239, ISBN: 978-1-4244-2324-8.

Application as Filed in U.S. Appl. No. 13/523,601, Lawrence Yonge III, Communicating over powerline media using eigen beamforming, dated Jun. 14, 2012.

"MIMO Communications over Residential Power Line Networks" May 2, 2007, 5 pages.

"Revolutionary Home Networking Technology is Named 2011 CES Innovations Award Honoree and TelcoTV Vision Award Winner," Sigma Design Press Release, Nov. 10, 2010, 2 pages.

"PCT Application No. PCT/US2012/042784 International Preliminary Report on Patentability", Sep. 19. 2013, 8 pages.

"U.S. Appl. No. 13/523,601 Office Action", Nov. 5, 2013, 7 pages.

$$PwrTotPL_{m,n} = \frac{E\left\{\left||\cos(\theta_n)\cdot S1|^2 + |\sin(\theta_n)\cdot S2|^2\right|\right\}}{Z_{LN}} + \frac{E\left\{\left|-e^{j\varphi_m}\sin(\theta_n)\cdot S1|^2 + |e^{j\varphi_m}\cos(\theta_n)\cdot S2|^2\right|\right\}}{Z_{LG}} + \frac{E\left\{\left|\cos(\theta_n)\cdot S1 - e^{j\varphi_m}\sin(\theta_n)\cdot S1|^2 + |\sin(\theta_n)\cdot S2 + e^{j\varphi_m}\cos(\theta_n)\cdot S2|^2\right|\right\}}{Z_{NG}}$$

FIG. 3

FIG. 4 (Table 1)

Total Power Injected Into the Powerline (PwrTotPL)

| φ \ θ | 0 | π/16 | 2π/16 | 3π/16 | 4π/16 | 5π/16 | 6π/16 | 7π/16 | 8π/16 |
|---|---|---|---|---|---|---|---|---|---|
| 0 | 1 | 1 | 1 | 1 | 1 | 1 | 1 | 1 | 1 |
| π/8 | 1 | 1 | 1 | 1 | 1 | 1 | 1 | 1 | 1 |
| 2π/8 | 1 | 1 | 1 | 1 | 1 | 1 | 1 | 1 | 1 |
| 3π/8 | 1 | 1 | 1 | 1 | 1 | 1 | 1 | 1 | 1 |
| 4π/8 | 1 | 1 | 1 | 1 | 1 | 1 | 1 | 1 | 1 |
| 5π/8 | 1 | 1 | 1 | 1 | 1 | 1 | 1 | 1 | 1 |
| 6π/8 | 1 | 1 | 1 | 1 | 1 | 1 | 1 | 1 | 1 |
| 7π/8 | 1 | 1 | 1 | 1 | 1 | 1 | 1 | 1 | 1 |
| 8π/8 | 1 | 1 | 1 | 1 | 1 | 1 | 1 | 1 | 1 |
| 9π/8 | 1 | 1 | 1 | 1 | 1 | 1 | 1 | 1 | 1 |
| 10π/8 | 1 | 1 | 1 | 1 | 1 | 1 | 1 | 1 | 1 |
| 11π/8 | 1 | 1 | 1 | 1 | 1 | 1 | 1 | 1 | 1 |
| 12π/8 | 1 | 1 | 1 | 1 | 1 | 1 | 1 | 1 | 1 |
| 13π/8 | 1 | 1 | 1 | 1 | 1 | 1 | 1 | 1 | 1 |
| 14π/8 | 1 | 1 | 1 | 1 | 1 | 1 | 1 | 1 | 1 |
| 15π/8 | 1 | 1 | 1 | 1 | 1 | 1 | 1 | 1 | 1 |
| 16π/8 | 1 | 1 | 1 | 1 | 1 | 1 | 1 | 1 | 1 |

Pmax = max(PwrTotPL) = 1

Pmin = min(PwrTotPL) = 1

10log(Pmax/Pmin) = 0

10log(Pmax) = 0

10log(Pmin) = 0

FIG. 5 (Table 2)

Total Power Injected Into the Powerline (PwrTotPL)

| φ \ θ | 0 | π/16 | 2π/16 | 3π/16 | 4π/16 | 5π/16 | 6π/16 | 7π/16 | 8π/16 |
|---|---|---|---|---|---|---|---|---|---|
| 0 | 1 | 0.885 | 0.788 | 0.723 | 0.7 | 0.723 | 0.788 | 0.885 | 1 |
| π/8 | 1 | 0.894 | 0.804 | 0.744 | 0.723 | 0.744 | 0.804 | 0.894 | 1 |
| 2π/8 | 1 | 0.919 | 0.85 | 0.804 | 0.788 | 0.804 | 0.85 | 0.919 | 1 |
| 3π/8 | 1 | 0.956 | 0.919 | 0.894 | 0.885 | 0.894 | 0.919 | 0.956 | 1 |
| 4π/8 | 1 | 1 | 1 | 1 | 1 | 1 | 1 | 1 | 1 |
| 5π/8 | 1 | 1.044 | 1.081 | 1.106 | 1.115 | 1.106 | 1.081 | 1.044 | 1 |
| 6π/8 | 1 | 1.081 | 1.15 | 1.196 | 1.212 | 1.196 | 1.15 | 1.081 | 1 |
| 7π/8 | 1 | 1.106 | 1.196 | 1.256 | 1.277 | 1.256 | 1.196 | 1.106 | 1 |
| 8π/8 | 1 | 1.115 | 1.212 | 1.277 | 1.3 | 1.277 | 1.212 | 1.115 | 1 |
| 9π/8 | 1 | 1.106 | 1.196 | 1.256 | 1.277 | 1.256 | 1.196 | 1.106 | 1 |
| 10π/8 | 1 | 1.081 | 1.15 | 1.196 | 1.212 | 1.196 | 1.15 | 1.081 | 1 |
| 11π/8 | 1 | 1.044 | 1.081 | 1.106 | 1.115 | 1.106 | 1.081 | 1.044 | 1 |
| 12π/8 | 1 | 1 | 1 | 1 | 1 | 1 | 1 | 1 | 1 |
| 13π/8 | 1 | 0.956 | 0.919 | 0.894 | 0.885 | 0.894 | 0.919 | 0.956 | 1 |
| 14π/8 | 1 | 0.919 | 0.85 | 0.804 | 0.788 | 0.804 | 0.85 | 0.919 | 1 |
| 15π/8 | 1 | 0.894 | 0.804 | 0.744 | 0.723 | 0.744 | 0.804 | 0.894 | 1 |
| 16π/8 | 1 | 0.885 | 0.788 | 0.723 | 0.7 | 0.723 | 0.788 | 0.885 | 1 |

$Pmax = max(PwrTotPL) = 1.3$ $Pmin = min(PwrTotPL) = 0.7$ $10\log(Pmax/Pmin) = 2.688$ $10\log(Pmax) = 1.139$ $10\log(Pmin) = -1.54$

*FIG. 6 (Table 3)*

Total Power Injected Into the Powerline (PwrTotPL)

| φ \ θ | 0 | π/16 | 2π/16 | 3π/16 | 4π/16 | 5π/16 | 6π/16 | 7π/16 | 8π/16 |
|---|---|---|---|---|---|---|---|---|---|
| 0 | 1 | 0.809 | 0.646 | 0.538 | 0.538 | 0.538 | 0.646 | 0.809 | 1 |
| π/8 | 1 | 0.823 | 0.673 | 0.573 | 0.573 | 0.573 | 0.673 | 0.823 | 1 |
| 2π/8 | 1 | 0.865 | 0.75 | 0.673 | 0.673 | 0.673 | 0.75 | 0.865 | 1 |
| 3π/8 | 1 | 0.927 | 0.865 | 0.823 | 0.809 | 0.823 | 0.865 | 0.927 | 1 |
| 4π/8 | 1 | 1 | 1 | 1 | 1 | 1 | 1 | 1 | 1 |
| 5π/8 | 1 | 1.073 | 1.135 | 1.177 | 1.191 | 1.177 | 1.135 | 1.073 | 1 |
| 6π/8 | 1 | 1.135 | 1.25 | 1.327 | 1.354 | 1.327 | 1.25 | 1.135 | 1 |
| 7π/8 | 1 | 1.177 | 1.327 | 1.427 | 1.462 | 1.427 | 1.327 | 1.177 | 1 |
| 8π/8 | 1 | 1.191 | 1.354 | 1.462 | 1.5 | 1.462 | 1.354 | 1.191 | 1 |
| 9π/8 | 1 | 1.177 | 1.327 | 1.427 | 1.462 | 1.427 | 1.327 | 1.177 | 1 |
| 10π/8 | 1 | 1.135 | 1.25 | 1.327 | 1.354 | 1.327 | 1.25 | 1.135 | 1 |
| 11π/8 | 1 | 1.073 | 1.135 | 1.177 | 1.191 | 1.177 | 1.135 | 1.073 | 1 |
| 12π/8 | 1 | 1 | 1 | 1 | 1 | 1 | 1 | 1 | 1 |
| 13π/8 | 1 | 0.927 | 0.865 | 0.823 | 0.809 | 0.823 | 0.865 | 0.927 | 1 |
| 14π/8 | 1 | 0.865 | 0.75 | 0.673 | 0.673 | 0.673 | 0.75 | 0.865 | 1 |
| 15π/8 | 1 | 0.823 | 0.673 | 0.573 | 0.573 | 0.573 | 0.673 | 0.823 | 1 |
| 16π/8 | 1 | 0.809 | 0.646 | 0.538 | 0.538 | 0.538 | 0.646 | 0.809 | 1 |

Pmax = max(PwrTotPL) = 1.5
Pmin = min(PwrTotPL) = 0.5
10log(Pmax/Pmin) = 4.771
10log(Pmax) = 1.761
10log(Pmin) = −3.01

*FIG. 7 (Table 4)*

900 determine a power adjustment factor α based on data including channel-descriptive information, wherein the channel-descriptive information includes a channel estimate or parameters derived from the channel estimate, wherein the channel estimate is an estimate of a channel between two or more inputs of the powerline medium and one or more outputs of the powerline medium  910 operate on a symbol s of a symbol stream to obtain two or more transmit values, wherein the symbol stream is determined by a stream of information bits, wherein the action of operating on the symbol s includes computing a transmit vector x by multiplying the symbol s by the power adjustment factor α and by a vector c, wherein the vector c is a column of a precoding matrix, wherein the precoding matrix is derived from the channel estimate, wherein the two or more transmit values are specified by respective components of the transmit vector x  915 transmit the two or more transmit values, respectively, through the two or more inputs of the powerline medium, wherein the power adjustment factor is determined so that power transmitted into the powerline medium is set to a predetermined value  920

FIG. 9

1100 determine a power adjustment factor based on data including channel-descriptive information, where the channel-descriptive information includes a channel estimate or parameters derived from the channel estimate, where the channel estimate is an estimate of a channel between two or more inputs of the powerline medium and one or more outputs of the powerline medium  1110 operate on a symbol vector to obtain two or more transmit values, where the symbol vector includes a first symbol from a first symbol stream and a second symbol from a second symbol stream, where the first and second symbol streams are determined by an information bit stream, where the action of operating on the symbol vector includes computing a transmit vector x by multiplying the symbol vector by the power adjustment factor and by a precoding matrix, where the precoding matrix is derived from the channel estimate, where the two or more transmit values are specified by respective components of the transmit vector x  1115 transmit the two or more transmit signals, respectively, through the two or more inputs of the powerline medium, where the power adjustment factor is determined so that power transmitted into the powerline medium is set to a predetermined value  1120

FIG. 11

1300 transform a symbol vector to obtain two or more transmit values, where the symbol vector includes one or more symbols from one or more corresponding symbol streams, where the action of transforming the symbol vector includes computing a transmit vector x by multiplying the symbol vector by a power adjustment factor α and by a matrix G comprising one or more columns of a precoding matrix, where the number of symbols in the symbol vector equals the number of precoding matrix columns in the matrix G, where the two or more transmit values are specified by respective components of the transmit vector x
1310 transmit the two or more transmit values onto the powerline medium, where the power adjustment factor α is determined so that power transmitted onto the powerline medium is set to a predetermined value   1320

*FIG. 13*

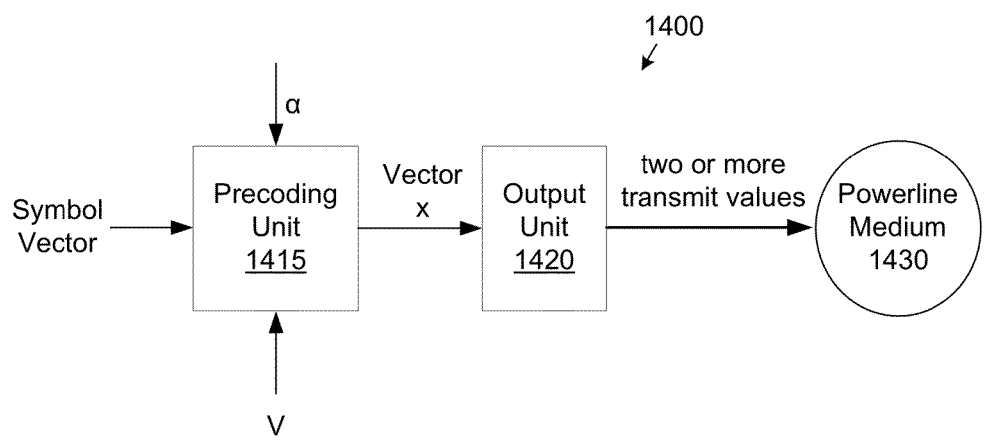

*FIG. 14*

COMMUNICATING OVER POWERLINE MEDIA USING SPOT BEAMFORMING

RELATED APPLICATION DATA

This application claims the benefit of priority to U.S. Provisional App. No. 61/497,425, filed on Jun. 15, 2011, entitled "Communicating Over Powerline Media Using Multiple-Input/Multiple-Output Transmission", invented by Lawrence W. Yonge III and Arun Avudainayagam, which is hereby incorporated by reference in its entirety as though fully and completely set forth herein.

FIELD OF THE DISCLOSURE

The present disclosure relates to the field of powerline communication, and more specifically, to systems and methods for adjusting transmit power of a powerline communication device based on knowledge of the transmission channel.

DESCRIPTION OF THE RELATED ART

Powerline communication devices are classified as unintentional radiators because they are not designed to transmit wirelessly. Instead, powerline communication devices communicate by transmitting through a powerline medium (e.g., the AC power wiring in a house or building). However, some of the signal power that is transmitted into the powerline medium ends up being radiated into space due to typical topologies of the powerline wiring. Because of this radiation, various regulatory bodies limit the total power radiated from the powerline medium or the total power conducted onto the powerline. For example, the FCC Part 15 rules define the limits for powerline devices based on a radiation limit. The powerline wiring in a typical home generally includes three wires that run in parallel, basically appearing as a parallel coupled transmission line at the frequencies used by powerline modems. Radiation typically occurs at points of discontinuity such as at a light switch that is open or closed, or where the wires are no longer closely spaced, such as at wiring junctions for outlets, switches, etc. Because data throughput is a function of transmitted power, there exists a need for systems and methods capable of using as much transmit power as possible without exceeding regulatory constraints on radiated power or transmitted power.

SUMMARY

In one embodiment, a method for operating a transmitter may involve the following actions. The method may be employed in order to transmit information through a powerline medium that includes at least three conductors.

The method may involve determining a power adjustment factor $\alpha$ based on data including channel-descriptive information. The channel-descriptive information may include a channel estimate or parameters derived from the channel estimate. The channel estimate is an estimate of a channel between two or more inputs of the powerline medium and one or more outputs of the powerline medium.

The method may also involve operating on a symbol s of a symbol stream to obtain two or more transmit values. The symbol stream may be determined by a stream of information bits, e.g., by means of a symbol mapping unit. The action of operating on the symbol s may include computing a transmit vector x by multiplying the symbol s by the power adjustment factor $\alpha$ and by a vector c. The vector c may be a column of a precoding matrix, e.g., a column of the precoding matrix corresponding to a larger eigenvalue of the channel. The precoding matrix may be derived from the channel estimate. The two or more transmit values may be specified by respective components of the transmit vector x.

The method may also involve transmitting the two or more transmit values, respectively, through the two or more inputs of the powerline medium. In some embodiments, the power adjustment factor $\alpha$ may be determined so that power transmitted into the powerline medium is set to a predetermined value. In other embodiments, the predetermined value may be selected to ensure that the power radiated from the powerline medium does not exceed a regulatory limit.

In another embodiment, a system may be configured to transmit information through a powerline medium that includes at least three conductors. The system may include a processing unit, a precoding unit and an output unit.

The processing unit may be configured to determine a power adjustment factor $\alpha$ based on data including channel-descriptive information. The channel-descriptive information may include a channel estimate or parameters derived from the channel estimate. The channel estimate is an estimate of a channel between two or more inputs of the powerline medium and one or more outputs of the powerline medium.

The precoding unit may be configured to operate on a symbol s of a symbol stream to obtain two or more transmit values. The symbol stream may be determined by a stream of information bits. The action of operating on the symbol s may include computing a transmit vector x by multiplying the symbol s by the power adjustment factor $\alpha$ and by a vector c. The vector c may be a column of a precoding matrix. The precoding matrix may be derived from the channel estimate. The two or more transmit values may be specified by respective components of the transmit vector x.

The output unit may be configured to transmit the two or more transmit values, respectively, through the two or more inputs of the powerline medium. The power adjustment factor $\alpha$ may be determined so that power transmitted into the powerline medium is set to a predetermined value.

In another embodiment, a method for operating a transmitter may involve the following actions. The method may be employed to transmit information through a powerline medium that includes at least three conductors.

The method may involve determining a power adjustment factor $\alpha$ based on data including channel-descriptive information. The channel-descriptive information may include a channel estimate or parameters derived from the channel estimate. The channel estimate may be an estimate of a channel between two or more inputs of the powerline medium and one or more outputs of the powerline medium.

The method may also involve operating on a symbol vector to obtain two or more transmit values. The symbol vector may include at least a first symbol from a first symbol stream and a second symbol from a second symbol stream. The first and second symbol streams may be determined by an information bit stream. The action of operating on the symbol vector may include computing a transmit vector x by multiplying the symbol vector by the power adjustment factor $\alpha$ and by a precoding matrix V. The precoding matrix V may be derived from the channel estimate. The two or more transmit values may be specified by respective components of the transmit vector x.

The method may also involve transmitting the two or more transmit values, respectively, through the two or more inputs of the powerline medium. The power adjustment factor $\alpha$ may be determined so that power transmitted into the powerline medium is set to a predetermined value.

In another embodiment, a system may be configured to transmit information through a powerline medium that includes at least three conductors. The system may include a processing unit, a precoding unit and an output unit.

The processing unit may be configured to determine a power adjustment factor $\alpha$ based on data including channel-descriptive information. The channel-descriptive information may include a channel estimate or parameters derived from the channel estimate. The channel estimate may be an estimate of a channel between two or more inputs of the powerline medium and one or more outputs of the powerline medium.

The precoding unit may be configured to operate on a symbol vector to obtain two or more transmit values. The symbol vector may include a first symbol from a first symbol stream and a second symbol from a second symbol stream. The first and second symbol streams may be determined by an information bit stream. The action of operating on the symbol vector may include computing a transmit vector x by multiplying the symbol vector by the power adjustment factor $\alpha$ and by a precoding matrix V. The precoding matrix may be derived from the channel estimate. The two or more transmit values may be specified by respective components of the transmit vector x.

The output unit may be configured to transmit the two or more transmit values, respectively, through the two or more inputs of the powerline medium. The power adjustment factor $\alpha$ may be determined so that power transmitted into the powerline medium is set to a predetermined value.

In some embodiments, a method for transmitting information through a powerline medium that includes at least three conductors may include the following operations.

The method may include transforming a symbol vector to obtain two or more transmit values. The symbol vector includes one or more symbols from one or more corresponding symbol streams. The one or more symbol streams may be determined by corresponding portions (substreams) of an information bit stream. The action of transforming the symbol vector includes computing a transmit vector x by multiplying the symbol vector by a power adjustment factor $\alpha$ and by a matrix G comprising one or more columns of a precoding matrix. The number of symbols in the symbol vector equals the number of precoding matrix columns in the matrix G. The precoding matrix is derived from a channel estimate, e.g., by performing a singular value decomposition of a matrix representing the channel estimate. The channel estimate is an estimate of a channel between two or more inputs of the powerline medium and one or more outputs of the powerline medium. The power adjustment factor $\alpha$ is determined based on data including channel descriptive information. The channel-descriptive information includes the channel estimate or parameters derived from the channel estimate. The two or more transmit values are specified by respective components of the transmit vector x.

The method may also include transmitting the two or more transmit values onto the powerline medium through the two or more inputs of the powerline medium. The power adjustment factor $\alpha$ is determined so that power transmitted into the powerline medium is set to a predetermined value. In one implementation, the predetermined value is selected to ensure that power radiated from the powerline medium does not exceed a regulatory limit. In another implementation, the predetermined value is selected to be equal to a regulatory limit on the power transmitted onto the powerline medium.

In one embodiment, the symbol vector includes only one symbol from one corresponding symbol stream, and the matrix G includes only one column of the precoding matrix.

In another embodiment, the symbol vector includes two or more symbols from two or more corresponding symbol streams, and the matrix G includes two or more columns of the precoding matrix.

In some embodiments, a system for transmitting information through a powerline medium may include a precoding unit and an output unit.

The precoding unit may be configured to transform a symbol vector to obtain two or more transmit values, where the symbol vector includes one or more symbols from one or more corresponding symbol streams. The one or more symbol streams may be determined by corresponding portions (substreams) of an information bit stream. The action of transforming the symbol vector includes computing a transmit vector x by multiplying the symbol vector by a power adjustment factor $\alpha$ and by a matrix G comprising one or more columns of a precoding matrix. The number of symbols in the symbol vector equals the number of precoding matrix columns in the matrix G. The precoding matrix is derived from a channel estimate, where the channel estimate is an estimate of a channel between two or more inputs of the powerline medium and one or more outputs of the powerline medium. The power adjustment factor $\alpha$ may be determined based on data including channel-descriptive information. The channel-descriptive information includes the channel estimate or parameters derived from the channel estimate. The two or more transmit values are specified by respective components of the transmit vector x.

An output unit may be configured to transmit the two or more transmit values onto the powerline medium through the two or more inputs of the powerline medium. The power adjustment factor $\alpha$ may be determined so that power transmitted into the powerline medium is set to a predetermined value.

In some embodiments, the symbol vector includes only one symbol from one corresponding symbol stream, and the matrix G includes only one column of the precoding matrix.

In some embodiments, the symbol vector includes two or more symbols from two or more corresponding symbol streams, and the matrix G includes two or more columns of the precoding matrix.

BRIEF DESCRIPTION OF THE DRAWINGS

A better understanding of the present invention can be obtained when the following detailed description of the preferred embodiments is considered in conjunction with the following drawings.

FIG. 3 is an equation for total power transmitted into the powerline medium given that two signals are transmitted, i.e., one on the LN pair and the other on the LG pair.

FIG. 4 is a table showing the power transmitted into the powerline medium as a function of angles $\theta$ and $\phi$ in the case of spot beamforming.

FIG. 5 is a table showing the power transmitted into the powerline medium as a function of angles $\theta$ and $\phi$ in the case of eigen beamforming with equal power allocation between the two transmitted symbol streams.

FIG. 6 is a table showing the power transmitted into the powerline medium as a function of angles $\theta$ and $\phi$ in the case of eigen beamforming with unequal power allocation, 80% of the total symbol power being allocated to the first symbol stream and 20% to the second symbol stream.

FIG. 7 is a table showing the power transmitted into the powerline medium as a function of angles θ and φ in the case of eigen beamforming with unequal power allocation, 100% of the total symbol power being allocated to the first symbol stream.

FIG. 9 illustrates one embodiment of a method for performing spot beamforming.

FIG. 11 illustrates one embodiment of a method for performing eigen beamforming.

FIG. 13 illustrates one embodiment of a method for performing beamforming for one or more symbol streams.

FIG. 14 illustrates one embodiment of a system for performing beamforming for one or more symbol streams.

Figure 1:
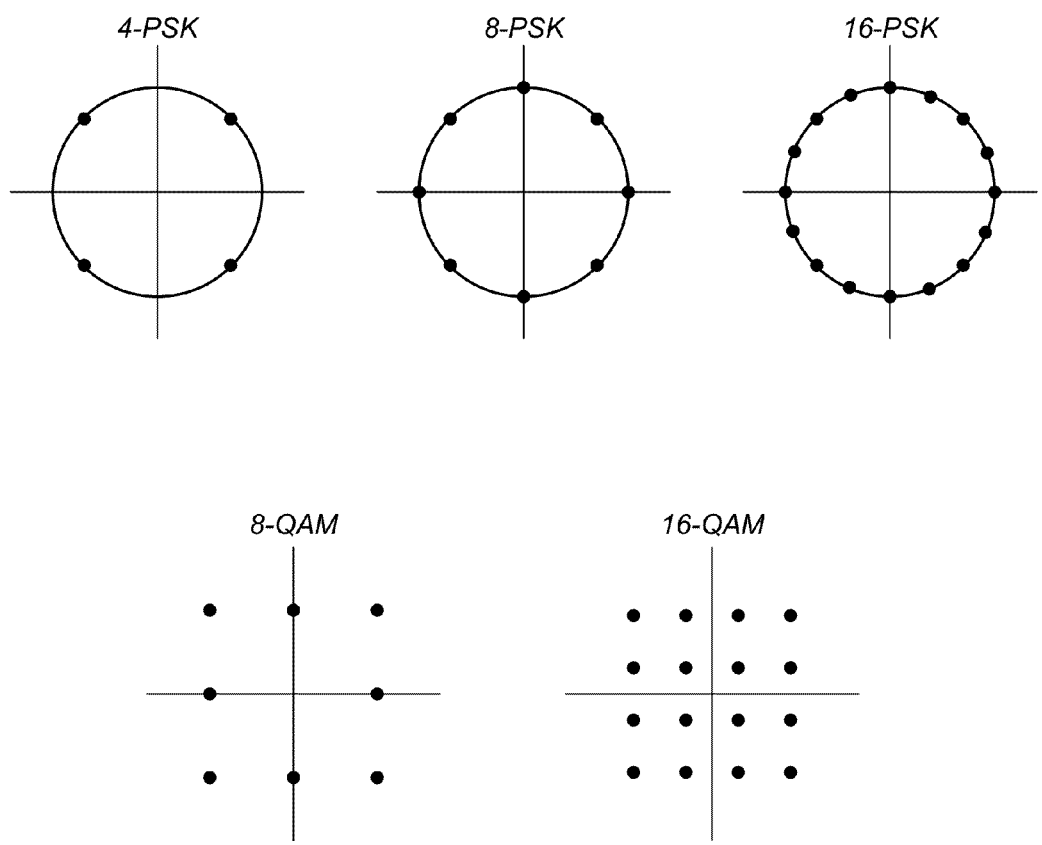
FIG. 1 illustrates several modulation schemes that might be used to generate the symbol streams described herein.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF EMBODIMENT(S)

Terminology

Memory Medium—A memory medium is a non-transitory medium configured for the storage and retrieval of signals and/or information. Examples of memory media include: various kinds of semiconductor memory such as RAM and ROM; various kinds of magnetic media such as magnetic disk, tape, strip, film, etc.; various kinds of optical media such as CD-ROM and DVD-ROM; various media based on the storage of electrical charge and/or other physical quantities; media fabricated using various lithographic techniques; etc. The term "memory medium" may also include a set of two or more memory media which reside at different locations, e.g., at different computers that are connected over a network.

Programmable Hardware Element—a hardware device that includes multiple programmable function blocks connected via a programmable interconnect. Examples include FPGAs (Field Programmable Gate Arrays), PLDs (Programmable Logic Devices), FPGAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computational Device—an electronic system that is programmable to execute an arbitrary computational algorithm. The term "computational device" includes within its scope of meaning any of the following: a computer system, a set of one or more interconnected computer systems, a system including one or more programmable hardware elements, a system including one or more programmable processors (e.g., microprocessors) and one or more programmable hardware elements. Any of the various embodiments described herein may be implemented using a computational device.

The various embodiments disclosed herein may be realized in any of various forms. For example, any of the embodiments disclosed herein may be realized as a computer-implemented method, a computer-readable memory medium, or a computer system. Furthermore, any of the embodiments disclosed herein may be realized in terms of one or more custom-designed hardware devices such as ASICs, or, one or more appropriately-configured programmable hardware elements (PHEs).

A computer-readable memory medium is a memory medium that stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may include a processor (or a set of processors) and a memory medium. The memory medium stores program instructions. The processor is configured to read and execute the program instructions from the memory medium. The program instructions are executable by the processor to implement a method, e.g., any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a tablet computer, a wearable computer, a computer integrated in a head-mounted display, etc.

In some embodiments, a set of computers distributed across a computer network (e.g., a powerline medium) may be configured to partition the effort of executing a computational method (e.g., any of the method embodiments disclosed herein).

The power lines found in many buildings include three wires, also referred to herein as "conductors". The three wires are typically referred to as line (L), neutral (N) and ground (G). While much of the following discussion assumes a power line having three wires, the inventive principles described apply more generally to power lines having three or more wires.

The power lines in a given building may be interconnected to form a power distribution network (also referred to herein as a powerline medium). A powerline communication (PLC) system may be configured to transfer information through the power distribution network by modulating one or more carrier signals with the information and then transmitting the one or more modulated carriers through the power distribution network. In some embodiments, the PLC system may use orthogonal frequency-division multiplexing (OFDM) as the modulation scheme. However, the inventive principles described herein apply to other modulation schemes as well.

The presence of three wires in a power line allows two signals to be simultaneously transmitted onto the power line, using, respectively, any two of the three possible wire pairs:

$$\{L,N\}, \{L,G\}, \{N,G\}.$$

For example, one of the signals might be transmitted on the LN pair, while the other signal might be transmitted on the LG pair. The voltage of the third unused pair is constrained by Kirchoff's voltage law.

A transmitter of the PLC system may be configured to transmit one or two symbol streams through the power distribution network. The choice of whether to transmit one symbol stream or two symbol streams may depend on the properties of the channel between the transmitter and receiver. (The properties of the channel may vary from one building to another, or, even in the same building, between different pairs of transmitter connection and receiver connection into the powerline medium.)

For example, the PLC system may use two symbol streams in one configuration of the channel, and only one symbol stream in another configuration of the channel. The one-stream scenario may be interpreted mathematically as a special case of the two-stream scenario by setting the second stream identically equal to zero. Thus, the discussion below starts with the two-stream scenario.

Let $S_1(k)$ and $S_2(k)$ denote the first and second symbol streams. (Integer k is a time index.) The two symbol streams may be represented by a vector stream S(k):

$$S(k) = \begin{bmatrix} S_1(k) \\ S_2(k) \end{bmatrix}.$$

The symbols in each symbol stream may be drawn from a transmit constellation (i.e., a finite set of complex numbers). In some embodiments, the constellation may be an M-PSK constellation or an M-QAM constellation, where M is an integer greater than or equal to two. Several examples of such constellations are shown in FIG. 1. (The integer M denotes the number of points in the constellation.) In particular, starting from the top-left, the following constellations are depicted: 4-PSK, 8-PSK, 16-PSK, 8-QAM and 16-QAM.

The information (bit stream) being transmitted determines the selection of the symbols in each symbol stream. For example, the bit stream may be split into two portions, one portion being used to determine the symbols in the first symbol stream, and the other portion being used to determine the symbols in the second symbol stream.

The transmitter operates on the two symbol streams to generate two signals $x_1(t)$ and $x_2(t)$, which are transmitted onto the power distribution network. In particular, the two signals are transmitted, respectively, onto two of the three possible wire pairs. (The choice of which two pairs are used for transmitting the two signals may be different in different embodiments of the PLC system, or in some embodiments, may be field programmable.) The two transmit signals may be represented by a vector signal x(t):

$$x(t) = \begin{bmatrix} x_1(t) \\ x_2(t) \end{bmatrix}.$$

A receiver of the PLC system may be configured to receive N signals from the power distribution network, where N=1, 2, 3 or 4 in the case of 3 wires. The N signals may be selected from the set $Z_4$ of four signals comprising: the voltage across the LN pair, the voltage across the LG pair, the voltage across the NG pair, and the common-mode voltage. Different ones of the N signals correspond to different ones of the signals in the set $Z_4$.

Different embodiments of the receiver may be configured to use different values of N. In some embodiments, the value of N used by the receiver may be programmable or dynamically adjustable. For any given value of N, different embodiments of the receiver may be configured to use different subsets of N signals selected from the set $Z_4$. (In some embodiments, the subset of N signals used by the receiver may be programmable or dynamically adjustable.)

In various embodiments, any one or any combination of two or more of the four receive ports (i.e., the four signals of the set $Z_4$) can be used.

The common mode is a common voltage detected on all conductors, such that the (differential mode) voltage between any two conductors is not included.

The common mode voltage is a voltage between all three wires and earth ground. (The earth ground is not to be confused with the ground wire of the powerline.) There are various means to measure the common mode voltage. A voltage reference for earth ground is used, such as a relatively large ground plane (e.g., several square feet in surface area). (The use of a large ground plane provides a very high capacitance between the receiver and earth-ground. The large capacitance offers a very low impedance to the high frequency signals used by the transmitter and thereby provides a "short-cut" for these signals to enter the receiver.) Thus, the measurement of common mode voltage might not necessarily be practical for all product configurations. Transformer configurations that provide an output winding for the common mode voltage are well known.

The N signals received by the receiver are denoted $y_1(t)$, $y_2(t), \ldots, y_N(t)$, and may be represented by a vector signal y(t):

$$y(t) = \begin{bmatrix} y_1(t) \\ y_2(t) \\ \vdots \\ y_N(t) \end{bmatrix}.$$

In the N=1 case, it is not necessary that the receiver should use (for receiving its single signal $y_1(t)$) one of the two pairs on which the transmitter is transmitting. For example, if the transmitter is transmitting on LN and LG, the receiver might possibly receive on NG.

In the N=2 case, it is not necessary that the receiver should receive its two signals $y_1(t)$ and $y_2(t)$ from the same two wire pairs that the transmitter is using to transmit. For example, if the transmitter is transmitting on LN and LG, the receiver might possibly receive on LN and NG, or, possibly on NG and common mode.

The relationship between the received vector signal y(t) and the transmitted vector signal x(t) is referred to as the "channel", and may be determined by factors such as the topology and geometry of the power distribution network, and the points of connection of the receiver and transmitter into the power distribution network. That channel may be characterized by an N×2 matrix H of complex numbers based on the linear equation y=Hx. The notation "N×2" means N rows by 2 columns. When N is greater than one, the channel is said to be a multiple-input/multiple-output (MIMO) channel. (In this terminology, the "inputs" are the inputs to the channel, and the "outputs" are the outputs from the channel.) When N equals one, the channel is said to be a multiple-input/ single-output (MISO) channel.

The PLC system may be referred to as being a "2×N MIMO system", where the 2 refers to the number of transmitter output ports and the N refers to the number of receiver input ports. (Recall, N=1, 2, 3 or 4.) For simplicity, we will use this terminology even in the N=1 case, although it is lexically more proper to refer to that case as being a 2×1 MISO system.

The receiver or the transmitter may estimate the channel matrix H. Methods for estimating the channel matrix H are well known in the art of signal processing, and thus need not be expounded upon here. In those embodiments where the receiver estimates the channel matrix H, the receiver may send the channel matrix estimate or information derived from the channel matrix estimate to the transmitter.

The 2×N MIMO system can be implemented with or without a technique called "beamforming". Beamforming is a transmit-side signal processing technique that can provide an improvement in throughput by tailoring transmissions to each realization of the channel. (The channel will generally be different in different buildings, and even in the same building, with different connection points of the transmitter and receiver into the building's power distribution network.) When two symbol streams are being transmitted the beamforming is referred to as eigen beamforming. When one symbol stream is being transmitted the beamforming is referred to as spot beamforming.

To support beamforming, the receiver or the transmitter may perform a singular value decomposition (SVD) on the channel matrix estimate $H_{est}$. That decomposition produces a matrix factorization of the form:

$$H_{est}=UDV^*. \quad (1)$$

The superscript "*" means "conjugate transpose", i.e., the matrix-transpose operation together with complex conjugation. U is an N×2 unitary matrix, which means $U^*U=I_{2\times 2}$ and $UU^*=I_{N\times N}$. V is a 2×2 unitary matrix, which means $V^*V=VV^*=I_{2\times 2}$. D is a 2×2 diagonal matrix: $D=\text{diag}(d_1, d_2)$. The diagonal entries $d_1$ and $d_2$ of D are referred to as the eigenvalues of the channel. The diagonal entries are non-negative. Without loss of generality one may assume that:

$$d_1 \geq d_2 \geq 0. \quad (2)$$

If the receiver computes the SVD, the receiver may send one or more pieces of the decomposition to the transmitter. For example, the receiver may send the matrices D and V (or perhaps, encoded representations of those matrices) to the transmitter.

The matrix V has a parameterization in terms of two angles, and another parameterization in terms of a magnitude and an angle. (These parameterizations are well known in the art of signal processing.) Thus, the receiver may communicate the matrix V to the transmitter by sending the two angles (or encoded representations of the two angles), or by sending the magnitude and phase (or encoded representations of the magnitude and phase).

As part of its data-transmission function, the transmitter may prepare a current transmit signal vector x by multiplying a current symbol vector $$S = \begin{bmatrix} S_1 \\ S_2 \end{bmatrix}$$

by the matrix V:

$$x=VS.$$

This operation of multiplying by matrix V is called "precoding", and the matrix V is referred to as "the precoding matrix". The two components $x_1$ and $x_2$ of the vector x may be transmitted onto the channel as described above. The receiver may then receive:

$$y=Hx=H(VS)\approx(UDV^*)(VS). \quad (3)$$

But recall that $V^*V=I$. So the received vector y may have the form:

$$y\approx UDS. \quad (4)$$

Notice that the effective channel has been simplified, i.e., no longer including the V* factor.

The receiver may multiply the vector y by the matrix U* to obtain a vector w:

$$w=U^*y\approx U^*(UDS). \quad (5)$$

However, recall that $U^*U=I$. So the vector w is given by:

$$w \approx DS = \begin{bmatrix} d_1 S_1 \\ d_2 S_2 \end{bmatrix}. \quad (6)$$

Thus, the two symbols $S_1$ and $S_2$ have been effectively decoupled (unmixed). The effective channel (S→w), including the multiplication stages in the transmitter and the receiver, is much simplified.

The above-described process may be applied to each symbol vector in the vector stream S(k). The receiver operates on the vector stream w(k) to recover the transmitted information stream.

As described above, in some situations, the transmitter may transmit only one symbol stream, e.g., the stream $S_1(k)$. In terms of the above mathematical analysis, one may address this single-stream case by setting the second stream $S_2(k)=0$. Thus, the precoding multiplication reduces to a multiplication between the symbol $S_1$ and the first column of matrix V:

$$x=VS=[v_1,v_2][S_1,S_2]^T=v_1 S_1, \quad (7)$$

where $v_1$ and $v_2$ are the columns of V.

In some embodiments, the above-described 2×N MIMO system may use OFDM as the modulation scheme. In the eigen-beamforming case (i.e., two independent symbol streams), the transmitter may divide (demultiplex) the bit stream I into two spatial streams $I_1$ and $I_2$. Each spatial stream $I_i$ is divided into M bit-sequences, where M is the number of frequency bins (or perhaps, positive frequency bins) associated with the OFDM:

$$\underline{I_1}=\{I_1(1),I_1(2),I_1(3),\ldots,I_1(M)\} \text{ and}$$

$$\underline{I_2}=\{I_2(1),I_2(2),I_2(3),\ldots,I_2(M)\}.$$

Each spatial stream $I_i$, i=1, 2, is mapped to a corresponding OFDM symbol stream $\underline{S_i}$ by a corresponding constellation mapper. In particular, each bit-sequence $I_i(j)$, j=1 to M, of spatial stream $I_i$ is mapped into a corresponding sequence $S_i(j)$ of constellation points corresponding to tone j. Symbol stream $\underline{S_i}$ is the composite of the resulting sequences. Thus, $$\underline{S_1}=\{S_1(1),S_1(2),\ldots,S_1(M)\}$$

$$\underline{S_2}=\{S_2(1),S_2(2),\ldots,S_2(M)\}.$$

In other words, at each time k, a current group of bits from the bit-sequence $I_i(j)$ is mapped to the constellation point $S_i(j,k)$, j=1, 2, . . . , M, and i=1, 2. The constellation points $S_i(1,k)$, $S_i(2,k)$, . . . , $S_i(M,k)$ together define the current OFDM symbol of the symbol stream $\underline{S_i}$. Different tones (carriers) of the constellation mappers may use different constellations, e.g., as determined by a tone map.

For tones j=1 to M, the current values $S_1(j,k)$ and $S_2(j,k)$ of the two symbol streams at time k are precoded using a matrix $V_j$ to obtain current values $x_1(j,k)$ and $x_2(j,k)$ of the modified symbol streams $x_1$ and $x_2$:

$$[x_1(j,k),x_2(j,k)]^T = V_j[S_1(j,k),S_2(j,k)]^T. \quad (8)$$

The index j is a frequency bin index (i.e., tone index); the index k is a time index that counts OFDM symbols. The complex values $\{x_1(j,k): j=1 \text{ to } M\}$ are transformed into a first time-domain sequence by means of an inverse discrete Fourier transform (preferably an IFFT). The first time-domain sequence is converted into a first analog signal, which is then amplified and transmitted through the transmitter's first output port (one of the three wire pairs). Similarly, the complex values $\{x_2(j,k): j=1 \text{ to } M\}$ are transformed into a second time-domain sequence by means of an inverse discrete Fourier transform (preferably an IFFT). The second time-domain sequence is converted into a second analog signal, which is then amplified and transmitted through the transmitter's second output port (another one of the three wire pairs). The IFFTs may be arranged so that their outputs (i.e., the first and second time-domain sequences) are real-valued sequences, e.g., by performing each IFFT on the conjugate-symmetric extension of the corresponding input dataset (i.e., setting negative-frequency coefficients to be the complex conjugate of the corresponding positive-frequency coefficients), or, by simply using a real IFFT.

While the transmitter transmits the two modulated signals onto the channel, the receiver receives N signals (N=1, 2, 3 or 4) from the channel. As described above, the N signals are selected from the above-described set $Z_4$. Each of the N signals may be sampled to form a corresponding real-valued time-domain sequence. Each of the N time-domain sequences may be partitioned into successive M-sample blocks, and each of the blocks may be transformed to obtain a corresponding M-sample frequency-domain symbol using a discrete Fourier transform (preferably an FFT). Let $Y_n(j,k)$ denote the value at tone (carrier) j of the frequency-domain symbol received at the current time k at receive port n (j=1, 2, ..., M and n=1, 2, ..., N). For j=1 to M, a vector comprising the current values $Y_1(j,k), Y_2(j,k), ..., Y_N(j,k)$ may be multiplied by the conjugate of a corresponding matrix $U_j$ to obtain received symbol values $w_1(j,k)$ and $w_2(j,k)$:

$$[w_1(j,k),w_2(j,k)]^T = U_j^*[Y_1(j,k),Y_2(j,k),...,Y_N(j,k)]^T. \quad (9)$$

The received symbol sequence $\{w_1(j,k): j=1, 2, ..., M\}$ and the received symbol sequence $\{w_2(j,k): j=1, 2, ..., M\}$ may be processed to recover estimates of the spatial streams $I_1$ and $I_2$. The estimates of the spatial streams $I_1$ and $I_1$ may be multiplexed together to form an estimate of the original bit stream I.

In the spot beamforming case (one symbol stream per OFDM carrier), the bit stream I is divided into M bit sequences I(1), I(2), ..., I(M); and the M bit sequences are mapped into M respective symbol sequences S(1), S(2), ..., S(M); the M symbol sequences are precoded according to the relation:

$$[x_1(j,k),x_2(j,k)]^T = S(j,k)*\text{firstcolumn}(V_j), \quad (10)$$

j=1, 2, ..., M, where firstcolumn($V_j$) denotes the first column of matrix $V_j$, where S(j,k) denotes the value of the symbol stream S(j) at the current time k.

Note that the sequence S(j) is a sequence of symbols corresponding to the modulation that is being used for tone j, while the current symbols S(1,k), S(2,k), ..., S(M,k) together form an OFDM symbol. Thus, the term "symbol" may be used with different meanings in different contexts.

As described above, the PLC transmitter may transmit one or two symbol streams, in either case using two transmit signals. The receiver receives N signals, where N=1, 2, 3 or 4. (Two symbol streams are supported when N is greater than one.) When N equals three, the receiver may receive the three signals $y_1(t)$, $y_2(t)$ and $y_3(t)$, respectively, from the three wire pairs LN, LG and NG. While the voltage on any pair is theoretically specified by the sum of the voltages on the other two wire pairs, field tests show performance benefits from using the third wire pair, probably due to factors such as parasitic coupling in the implementation between the different receiver inputs, and possibly different noise characteristics of each of the receiver's input amplifiers.

When eigen beamforming is being employed, the transmitter may scale the symbol vector stream S(k) so that the power transmitted into the power distribution network is as large as possible within the limit imposed by government regulation. (The regulatory limit may be different in different countries/jurisdictions. Thus, the power limit may be a programmable parameter so that the transmitter may be used in any country/jurisdiction.) Similarly, when spot beamforming is being employed, the transmitter may scale the symbol stream $S_1(k)$ so that the transmitted power is as large as possible within the limit imposed by government regulation.

Furthermore, in eigen beamforming, the transmitter may further apply power allocation to improve throughput capacity. Power allocation means controlling how much of the total symbol power is allocated to the first symbol stream $S_1(k)$ vs. the second symbol stream $S_2(k)$, e.g., based on the values of the channel eigenvalues $d_1$ and $d_2$. For example, if $d_1$ is larger than $d_2$, it would be reasonable to allocate more of the transmitted power to the first symbol stream $S_1(k)$. Spot beamforming can be considered a special case of eigen beamforming with power allocation, i.e., the case where all of the power is applied to the first symbol stream $S_1(k)$. Spot beamforming is typically used when the receiver has only one receive port (2×1 MIMO) or under certain conditions of the channel (e.g., when the channel matrix is ill conditioned, resulting in one of the eigenvalues being near zero, which can occur when the MIMO channels are highly correlated).

The precoding matrix V may be parameterized in terms of two angles as follows:

$$V = \begin{bmatrix} 1 & 0 \\ 0 & e^{j\varphi} \end{bmatrix} \begin{bmatrix} \cos\theta & \sin\theta \\ -\sin\theta & \cos\theta \end{bmatrix}. \quad (11)$$

The transmitted signals $x_1$ and $x_2$ on a particular carrier frequency are given by:

$$x = \begin{bmatrix} x_1 \\ x_2 \end{bmatrix} = VS = V \begin{bmatrix} s_1 \\ s_2 \end{bmatrix}, \quad (12)$$

where $s_1$ and $s_2$ are constellation symbols (or scaled versions of constellation symbols) belonging to a finite alphabet (e.g. M-PSK or M-QAM). (In the case of eigen beamforming with unequal power allocation, the symbol streams $s_1$ and $s_2$ are scaled differently so that $E[|s_1|^2]$ and $E[|s_2|^2]$ are unequal.) The above equation represents the transmitted signals for eigen beamforming, where the vector S has two elements, one element for each of the two symbol streams being transmitted. For spot beamforming $S=[s_1]$ since there is only one symbol stream being transmitted, and only the first column of V is used for precoding. Thus, the transmitted signals at a particular carrier frequency on the two transmit ports (e.g., line-neutral and line-ground) are given by:

$$x = \begin{bmatrix} x_1 \\ x_2 \end{bmatrix} = \begin{bmatrix} \cos\theta \\ -e^{j\varphi}\sin\theta \end{bmatrix} s_1, \quad (13)$$

Thus, $x_1$ is a scaled version of symbol $s_1$, and $x_2$ is a scaled and phase-shifted version of symbol $s_1$. The angle $\theta$ determines scaling factors $\cos(\theta)$ and $\sin(\theta)$, and the angle $\varphi$ determines the phase shift. The V matrix may alternatively be represented in terms of a magnitude and phase. The magnitude and phase characterization of V may be written, e.g., as $$V = \begin{bmatrix} 1 & 0 \\ 0 & e^{j\varphi} \end{bmatrix} \begin{bmatrix} r & \sqrt{1-r^2} \\ -\sqrt{1-r^2} & r \end{bmatrix}. \quad (11B)$$

(This expression may be obtained by making the substitution $r=\cos(\theta)$ in equation (11).) However this is only one way of representing V. Alternatively, one may multiply each column of V by a different complex constant of the form $\exp(j\delta)$ to obtain a different V matrix that can still be used for beamforming. The receiver may undo the effect of the constant multiplications via the U matrix, to properly decouple the signal.

Additionally, the V matrix may be quantized to a set of discrete values, and encoded in a number of different ways, such as in terms of quantized angles, quantized magnitude and angle, or a lookup table such as a codebook, in order to efficiently communicate the V matrix to another device, such as from a receiver that computed the V matrix to a transmitter.

Powerline communication devices are classified as unintentional radiators because they are not designed to transmit wirelessly. Instead, powerline communication devices communicate by transmitting through a powerline medium (e.g., the house or building AC power wiring). However, some of the signal power that is transmitted into the powerline medium ends up being radiated into space due to typical topologies of the powerline wiring. Because of this radiation, various regulatory bodies limit the total transmit power allowed on the powerline medium. For example, the FCC Part 15 rules define the limits for powerline devices based on a radiation limit. The powerline wiring in a typical home is generally three wires that run in parallel, basically appearing as a parallel coupled transmission line at the frequencies used by powerline modems. Radiation typically occurs at points of discontinuity such as at a light switch that is open or closed, or where the wires are no longer closely spaced, such as at wiring junctions for outlets, switches, etc. There is a linear relationship between the power transmitted onto the powerline medium and the amount of power that is radiated; the radiation efficiency may vary from one home or building to another. The different wiring topologies and construction of various homes will result in different amounts of radiation for a given transmit power injected to the powerline medium. However, a typical and a maximum radiation efficiency can be determined by measuring and analyzing a large enough sample set of homes. Based on testing of the radiation characteristics of a number of homes in the United States in the 2-30 MHz band, a transmit level of −50 dBm/Hz measured with a quasi-peak detector conducted into 50 ohms will typically meet the radiation limits set by the FCC in Part 15 of the regulations. These tests were performed while transmitting on the line-neutral pair. Powerline devices today are set to a fixed power level (typically at or below −50 dBm/Hz) in order to meet the regulatory requirements.

In estimating the amount of radiation when there are two signals transmitted onto the powerline medium, the principle remains the same as for a single transmitted signal; it is sufficient to estimate the total power transmitted onto the power line in order to estimate the power that will be radiated. This is true because the wavelength of the frequencies typically used on the power line, 2-28 MHz, are very long (>10 meters). Thus the relative phase and amplitude between the two transmitted signals is likely to be nearly constant in space regardless of where the radiation is measured since the radiation from the two transmitter "antennas" is practically equivalent to the radiation from two co-located antennas. For beamforming to be effective in space, the antennas are preferably separated by a significant portion of a wavelength. Thus, beamforming on the powerline wires does not result in significant beamforming of the radiated signal, especially in the frequency bands typically used by powerline modems (e.g., less than 100 MHz).

The total power transmitted into the powerline medium is the sum of the power applied to each of the two wire pairs. In the case of one transmitted signal (SISO), the power is equal to the square of this signal voltage divided by the total impedance of the wire pair. For example, assuming that the one signal is transmitted on the LN pair:

$$P_{SISO} = \frac{E\{|V_{LN}|^2\}}{Z_{LN} \| (Z_{LG} + Z_{NG})}. \quad (14)$$

$$\Rightarrow P_{SISO} = \frac{E\{|V_{LN}|^2\}(Z_{LN} + Z_{LG} + Z_{NG})}{Z_{LN}(Z_{LG} + Z_{NG})}. \quad (15)$$

Assuming that $Z_{LN}=Z_{LG}=Z_{NG}=1$, $$P_{SISO}=3/2E\{|V_{LN}|^2\}. \quad (16)$$

Figure 2:
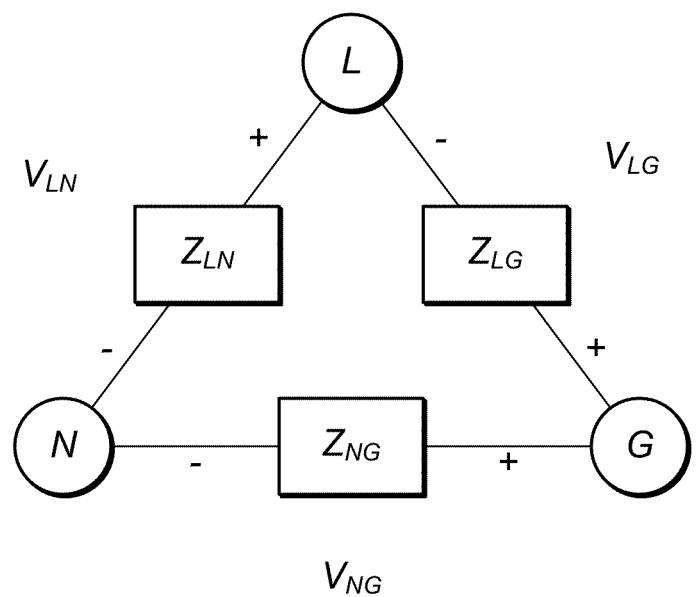
FIG. 2 illustrates the definitions of the voltage pairs $V_{LN}$, $V_{LG}$ and $V_{NG}$ according to one embodiment.

In the case of two transmitted signals, the total power transmitted into the powerline medium is the sum of the power into each of the three wire pairs:

$$PwrTotPL = \frac{E\{|V_{LN}|^2\}}{Z_{LN}} + \frac{E\{|V_{LG}|^2\}}{Z_{LG}} + \frac{E\{|V_{NG}|^2\}}{Z_{NG}}, \quad (17)$$

where the notation $E\{|V|^2\}$ denotes the average (or expected value) of the magnitude squared of V, where $V_{NG}=V_{LN}+V_{LG}$, and where $Z_{LN}$, $Z_{LG}$ and $Z_{NG}$ are the impedances of the wire pairs as suggested in FIG. 2.

For example, based on the precoding equation x=VS, on the two-angle characterization of matrix V (i.e., equation 11), and on the relations $x_1=V_{LN}$ and $x_2=V_{LG}$, it follows that:

$$V_{LN}=\cos(\theta_n)S1+\sin(\theta_n)S2,$$

$$V_{LG}=-\exp(j\phi_m)\sin(\theta_n)S1+\exp(j\phi_m)\cos(\theta_n)S2.$$

When computing the average value of squared magnitudes of voltages such as $V_{LN}$, the result depends on whether or not S1 and S2 are correlated. If S1 and S2 are uncorrelated, the average (expected value) of mixed terms involving S1S2* and S1*S2 collapse to zero, leaving terms involving $|S1|^2$ and $|S2|^2$. Thus, the average value of $|V_{LN}|^2$ is given by:

$$E\{|V_{LN}|^2\} = E\{|\cos(\theta_n)S1|^2\} + E\{|\sin(\theta_n)S2|^2\}$$
$$= |\cos(\theta_n)|^2 E\{|S1|^2\} + |\sin(\theta_n)|^2 E\{|S2|^2\}.$$

Assuming the transmit symbol vector $S=[S1\ S2]^T$, where S1 and S2 are independent signals, the total power transmitted into the powerline medium is given by the equation shown in FIG. 3. This equation assumes the output impedances of the transmit amplifiers can be neglected. (This assumption is reasonable since the output impedances are typically much smaller than the impedances of the powerline medium.) However, it should be understood that the principles of the present invention are not so limited; alternative embodiments are contemplated where the output impedances are significant compared to (or larger than) the impedances of the powerline medium.

Each of Tables 1-4 (FIGS. 4-7) illustrates the variation of the total transmit power (also referred to as total injected power) into the powerline medium as a function of the angle parameters θ and φ of the precoding matrix V with the average total symbol power held constant. (The total transmit power is calculated based on the equation of FIG. 3.) In the spot beamforming case, the average total symbol power is the average symbol power of the single symbol stream $S_1$. (The average symbol power of a given symbol stream is the average square magnitude of the symbols in the symbol stream, or the average square magnitude of the points in the constellation being used to generate the symbol stream.) In the eigen beamforming case, the average total symbol power is the sum of the average symbol powers of the streams $S_1$ and $S_2$.

Table 1 illustrates the case of spot beamforming (i.e., the second symbol stream $S_2$ is identically zero) with the average symbol power of the first symbol stream $S_1$ being ⅓. Tables 2 and 3 illustrate the case of eigen beamforming (i.e., both symbol streams $S_1$ and $S_2$ are used) with the average total symbol power being equal to ½. Tables 2 and 3 differ in that they assume different values for a power allocation parameter. (The power allocation parameter controls how much of the average total symbol power is allocated to the first symbol stream $S_1$ vs. the second symbol stream $S_2$.) Table 4 illustrates the case of spot beamforming with average symbol power of the first stream $S_1$ being equal to ½.

Recall from the discussion above that the precoding matrix V is one of the factors of the singular value decomposition of the channel estimate matrix $H_{est}=UDV^*$. Thus, one can readily see from each of Tables 1-4 that the total transmit power varies with different conditions of the channel. For example, if one changes the point of access (to the powerline medium) of the transmitter or the receiver, the channel properties may change, and thus, the total transmit power may change, even though the average total symbol power is held constant. Given the angles θ and φ that characterize the precoding matrix V, one can use the equation of FIG. 3 to compute the total transmit power that would result if the symbol stream(s) were transmitted using the precoding matrix V. If the computed total transmit power is less than a predetermined value (e.g., a regulatory maximum value), then the symbol stream(s) may be scaled up in magnitude so that the scaled symbol stream(s) will give a total transmit power equal to the predetermined value. Alternatively, if the computed total transmit power is greater than the predetermined value, then the symbol stream(s) may be scaled down in magnitude so that the scaled symbol stream(s) will give a total transmit power equal to the predetermined value.

For each of the Tables, the angles are varied as follows:

$\theta_n=(\pi/2)(n/8), n=0, 1, \ldots, 8$; and $\phi_m=(2\pi)(m/16), m=0, 1, \ldots, 16$.

In the case of spot beamforming (i.e. S2=0), which is shown in Table 1 (FIG. 4), the total power transmitted can vary over a 4.77 dB range depending on the condition of the precoding matrix. Table 1 assumes $E\{|S1|^2\}=\frac{1}{3}$ and $E\{|S2|^2\}=0$, and $Z_{LN}=Z_{LG}=Z_{NG}=1$.

In the case of eigen beamforming with equal power allocation and with equal impedance for all three wire pairs, which is shown in Table 2 (FIG. 5), the total power transmitted onto the powerline is constant regardless of the precoding matrix. Table 2 assumes: $E\{|S1|^2\}=\frac{1}{2}$ and $E\{|S2|^2\}=\frac{1}{2}$, symbol streams S1 and S2 are uncorrelated, and $Z_{LN}=Z_{LG}=Z_{NG}=1$.

In the case of eigen beamforming with unequal power allocation and 80% of the power being allocated to stream S1, which is shown in Table 3 (FIG. 6), the total power transmitted can vary over a 2.69 dB range. Table 3 assumes that:

PwrAloc=0.8, $E\{|S1|^2\}=(\text{PwrAloc})^{1/2}=0.4,$ $E\{|S2|^2\}=(1-\text{PwrAloc})^{1/2}=0.1$ S1 and S2 are uncorrelated, $Z_{LN}=Z_{LG}=Z_{NG}=1.$ In the limit as power allocation to stream S1 approaches 100%, eigen beamforming degenerates to spot beamforming Table 4 illustrates this limiting case. Note that the total power transmitted can vary over a 4.77 dB range. Table 4 assumes:

PwrAloc=1.0, $E\{|S1|^2\}=(\text{PwrAloc})^{1/2}=0.5,$ $E\{|S2|^2\}=(1-\text{PwrAloc})^{1/2}=0,$ $Z_{LN}=Z_{LG}=Z_{NG}=1.$ (Note that Tables 1 and 4 each illustrate the spot beamforming case, but with different assumed values for average symbol (constellation) power. Table 1 assumes an average symbol power of ⅓, while Table 4 assumes an average symbol power of ½.)

In order to maximize the transmit power conducted into the powerline medium (and thus maximize the data throughput) and to also meet the regulatory limits on radiation when using eigen beamforming with unequal power allocation or when using spot beamforming, the precoding matrix V may be used to compute the total transmit power and/or to adjust the total transmit power to the maximum limit (e.g. −50 dBm/Hz). The adjustment involves increasing or decreasing the total transmit power, depending on whether the total transmit power is respectively below or above the maximum limit.

In Table 3 (FIG. 6), which shows the case of eigen beamforming with 80% of the power allocated to stream S1, note that the total injected power varies from 1.3 (for θ=π/4 and φ=π) to 0.7 (for θ=0 and φ=π). Relative to a total injected power of 1.0, the value 1.3 corresponds to 1.139 dB and the value 0.7 corresponds to −1.54 dB. Thus, the power level of streams S1 and S2 can be decreased as much as 1.139 dB or increased as much as 1.54 dB in order to maintain a total transmit power into the powerline medium of 1. For the spot beamforming case shown in Table 1, the power of stream S1 may be increased as much 4.77 dB. This power adjustment may result in a significant increase in throughput on many powerline channels compared to having to use a fixed transmit power level, which would have to be set for the worst case condition of the channel. (Increasing the total injected power increases the signal-to-noise ratio, and thus, may decrease the rate of bit errors in decoding.)

The transmit power adjustment factor may be computed based on parameters characterizing the precoding matrix V and based on the choice of power allocation between the two streams. (In the case of spot beamforming, the power allocation information is not necessary to determine the adjustment factor since spot beamforming by definition uses only one symbol stream.) As noted above, there are various way of characterizing the precoding matrix V, e.g., using two angles, using magnitude and angle, or using all four matrix elements.

In one approach, a table can be used to store values of the transmit power adjustment factor as a function of the characterizing parameters of the precoding matrix and of the power allocation. (As noted above, in the spot beamforming case, the power allocation is not necessary.) In some embodiments, the precoding matrix V is quantized to a set of discrete values using a quantized set of angle parameters θ and φ, or a specific set defined by a codebook (e.g., a lookup table).

Denoting the transmit power adjustment factor as $\alpha(\phi,\theta)$, a modified spot-beamforming equation that represents the transmitted signals on the two transmit ports can be written as:

$$x = \begin{bmatrix} x_1 \\ x_2 \end{bmatrix} = \alpha(\varphi, \theta) \begin{bmatrix} \cos\theta \\ -e^{j\varphi}\sin\theta \end{bmatrix} s_1. \tag{18}$$

The power adjustment factor α in this spot-beamforming case may be determined according to the expression $$\alpha(\varphi, \theta) = \sqrt{\frac{P}{a - b\sin(2\theta)\cos(\varphi)}}, \tag{19}$$

where the constants P, a and b may be chosen to comply with regulations on emissions (e.g., radiated emissions or transmitted emissions). (In one specific case, a=2 and b=1. However, a wide variety of other values are possible for a and b. In another specific case, P is proportional to the average constellation energy used in the PLC communication system. However, P can be related other alternative metrics like total transmitted power, the total emissions limit etc). In some embodiments, the constants P, a and b are chosen to keep the total power injected into the powerline medium equal to that in eigen beamforming with equal power allocation.

In some embodiments, the transmitter is assumed to be designed or calibrated or set so that its transmit power without beamforming and without power adjustment equals a predetermined power level, e.g., a power level that is chosen to maximize transmit power subject to any regulatory limit on transmit power and/or radiated power. (For example, in some embodiments or jurisdictions, the predetermined power level may be −50 dBm/Hz. That particular number is based on field measurements of a number of homes using a SISO configuration. In another embodiment, the predetermined power level may be −53 dBm/Hz per transmitter output port. However, in various embodiments, a wide variety of other values or ranges of values may be used for the predetermined power level.)

In some embodiments, the transmitter and/or the receiver may determine the power adjustment factor by evaluating the above expression based on the angle θ and φ. Alternatively, the power adjustment factor may be determined by table lookup.

In some embodiments, the total power transmitted into the powerline medium may be based on a measurement or estimate of the impedance of each wire pair at the transmitter. Embodiments of the transmitter and receiver configured to make such measurements are contemplated.

In some embodiments, the transmitter may send the transmit power adjustment factor to the receiver so that the receiver may apply the adjustment factor per OFDM carrier, to enable smoothing (or filtering) of the channel matrices $H_{est}(j)$ as a function of carrier frequency $f_j$, in order to obtain a better estimate of the channel for decoding the spot-beamformed payload. Smoothing may be applied individually to each element of the $H_{est}$ matrix. Note that smoothing takes advantage of the fact that the length of the channel impulse response is significantly less than the OFDM symbol length. Thus, during channel estimation (magnitude and phase for each carrier), the estimate of the impulse response of the channel can be windowed to zero out much of the noise, often implemented with a small FIR filter in the frequency domain (carriers). Recall that convolution in one domain is equivalent to windowing in the other domain. (Smoothing can be applied in the eigen beamforming cases as well.)

Note that typically the precoding matrix is determined by the receiver, but it can alternately be determined by the transmitter. In some embodiments, the precoding matrix, the power allocation and the transmit power adjustment factor may be used by the receiver, e.g., depending on the whether or not smoothing of the channel estimate is performed, and/or, on whether or not beamforming (precoding) is applied to the preamble and/or header (e.g. frame control).

In the eigen beamforming case, power adjustment may be applied based on the following expression:

$$x = \begin{bmatrix} x_1 \\ x_2 \end{bmatrix} = \alpha(\varphi, \theta)VS = \alpha(\varphi, \theta)V\begin{bmatrix} s_1 \\ s_2 \end{bmatrix}. \tag{20}$$

In some embodiments, the transmit power adjustment factor $\alpha(\phi, \theta)$ may be determined based on the expression:

$$\alpha(\phi, \theta) = \sqrt{\frac{P}{a + b(1 - 2\gamma)\sin(2\theta)\cos(\phi)}},$$

where γ, 0≤γ≤1, represents the fraction of the total power allocated to stream $S_1$ and (1−γ) represents the fraction of the total power allocated to stream $S_2$, and the constants P, a and b may be chosen to comply with regulations on emissions (e.g., radiated emissions or transmitted emissions). The constants P, a and b may alternatively be chosen to keep the total power injected into the powerline medium equal to that in eigen beamforming with equal power allocation.

Figure 8A:
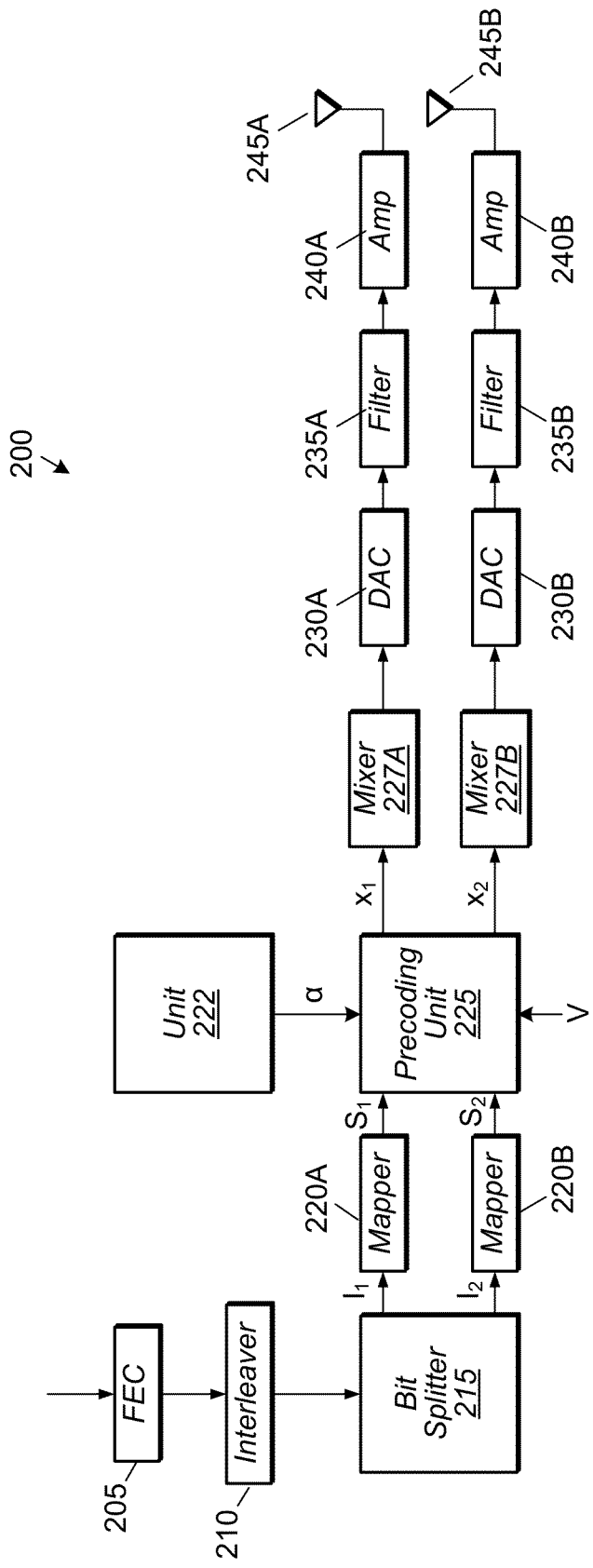
FIG. 8A illustrates one embodiment of a transmitter that may be used as part of a 2×N MIMO system.
Figure 8B:
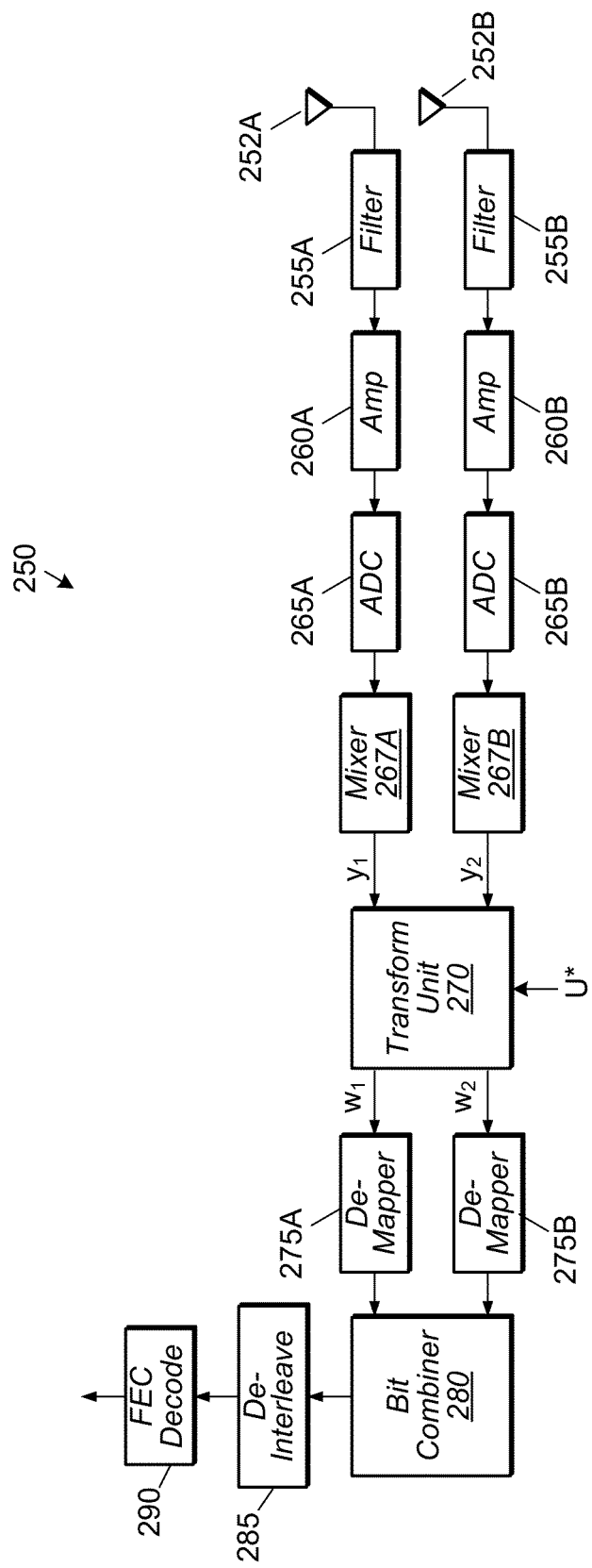
FIG. 8B illustrates one embodiment of a receiver that may be used as part of a 2×2 MIMO system.

FIGS. 8A and 8B show one embodiment of the transmitter and the receiver in the case of a 2×2 MIMO system.

As shown in FIG. 8A, the transmitter 200 may include a forward-error-correction (FEC) encoder 205, a bit interleaver 210, a bit splitter 215, mappers 220A and 220B, precoding unit 225, digital-to-analog converters (DACs) 230A and 230B, filters 235A and 235B, amplifiers 240A and 240B. The output ports 245A and 245B may be configured for coupling to the power distribution network at a first point of access to the power distribution network (e.g., at a wall outlet). In particular, the two output ports may be configured for coupling respectively to two of the three wire pairs of the power distribution network (e.g., the LN pair and the LG pair).

The FEC encoder 205 may receive a bit stream and perform forward error correction on the bit stream to obtain a modified bit stream.

The interleaver 210 may receive the modified bit stream and interleave the modified bit stream to obtain an interleaved bit stream. The interleaving may involve permuting (e.g., pseudo-randomly permuting) the order of the bits within each block of the modified bit stream.

The bit splitter 215 may receive the interleaved bit stream and split (i.e., demultiplex) the interleaved bit stream into two substreams $I_1$ and $I_2$.

The mapper 220A may receive the substream $I_1$ and map the substream $I_1$ into a symbol stream $S_1$ using any of wide variety of signal constellations, e.g., based on an M-QAM constellation or an M-PSK constellation with M being an integer greater than one. Similarly, mapper 220B may receive the substream $I_2$ and map the substream $I_2$ into a symbol stream $S_2$.

The precoding unit 225 may compute the transmit vector stream $x=[x_1,x_2]^T$ based on the symbol vector stream $S=[S_1, S_2]^T$, the precoding matrix V and the power adjustment factor α, e.g., as variously described above. In particular, the precoding unit may compute the transmit vector stream x according to the expression $x(k)=\alpha VS(k)$, where k is a time index. The power adjustment factor α may be computed by the unit 222, e.g., as variously described above.

Mixer 227A may receive the transmit stream $x_1$, and mix the real and imaginary parts of the transmit stream $x_1$ respectively with a pair of orthogonal carrier tones to obtain a first modulated carrier, e.g., according to the expression:

$Re\{x_1(k)\} \cos(\omega k) - Im\{x_1(k)\} \sin(\omega k)$, where ω is the carrier frequency. Similarly, mixer 227B may receive the transmit stream $x_2$, and mix the real and imaginary parts of the transmit stream $x_2$ respectively with the pair of orthogonal carrier tones to obtain a second modulated carrier, e.g., according to the relation:

$Re\{x_2(k)\} \cos(\omega k) - Im\{x_2(k)\} \sin(\omega k)$.

In alternative embodiments, the mixers may be analog mixers, situated after the DACs 230 and 230B, or after the filters 235A and 235B.

DAC 230A may convert the first modulated carrier into a first analog signal. The filter 235A may filter the first analog signal to obtain a first filtered signal. (The filter 235A may be a lowpass filter or a bandpass filter.) The amplifier 240A may amplify the first filtered signal to obtain a first amplified signal, which may be supplied to the output port 245A for transmission onto the power distribution network.

DAC 230B may convert the second modulated carrier into a second analog signal. The filter 235B may filter the second analog signal to obtain a second filtered signal. (The filter 235B may be a lowpass filter or a bandpass filter.) The amplifier 240B may amplify the second filtered signal to obtain a second amplified signal, which may be supplied to the output port 245B for transmission onto the power distribution network.

FEC encoder 205, interleaver 210, bit splitter 215, mappers 220A and 220B, unit 222, precoding unit 225 and mixers 227A and 227B may be implemented in any of various forms, e.g., in terms of any of or any combination of the following: custom-designed digital circuitry such as one or more application-specific integrated circuits (ASICs); one or more processors configured to execute program instructions; and one or more programmable hardware elements such as field programmable gate arrays (FPGAs).

In some embodiments, OFDM may be used as the multiplexing scheme, in which case the mappers 220A and 220B may be interpreted as OFDM mappers; unit 222 may be configured to compute a separate power adjustment factor $\alpha_j$ for each carrier frequency $\omega_j$ based on the precoding matrix $V_j$ corresponding to the carrier frequency $\omega_j$; precoding unit 225 may be configured to perform the multiplication $\alpha_j V_j S$ for each carrier frequency $\omega_j$; and each of mixers 227A and 227B may be replaced by a respective IFFT unit.

As shown in FIG. 8B, the receiver 250 may include input ports 252A and 252B, filters 255A and 255B, amplifiers 260A and 260B, analog-to-digital converters (ADCs) 265A and 265B, mixers 267A and 267B, transform unit 270, demapping units 275A and 275B, bit combiner 280, bit deinterleaver 285 and FEC decoder 290.

The input ports 252A and 252B may be configured for coupling to the power distribution network at a second point of access to the power distribution network (e.g., at a wall outlet). In particular, the two input ports are configured for coupling to the power distribution network so as to receive two of the four signals in the set $Z_4$ as described above. The signal received at input port 252A may be filtered (e.g., lowpass filtered) by filter 255A, amplified by amplifier 260A, digitized by ADC 265A, and mixed with an orthogonal pair of carrier tones (at frequency ω) by mixer 267A to produce a complex signal $y_1$. Similarly, the signal received at input port 252B may be filtered (e.g., lowpass filtered) by filter 255B, amplified by amplifier 260B, digitized by ADC 265B, and mixed with the orthogonal pair of carrier tones by mixer 267B to produce a complex signal $y_2$.

The transform unit 270 may apply a linear transformation to the vector signal $y=[y_1,y_2]^T$ to obtain a modified vector signal $w=[w_1,w_2]^T$, e.g., as described above. In particular, the transform unit may multiply the vector signal y by the matrix U* according to the expression $w=(U^*)y$. The matrix U is the first factor from a singular value decomposition of the channel matrix estimate $H_{est}$, e.g., as described above.

The demapper 275A may demap the modified signal $w_1$ to obtain a first bit stream that represents an estimate of the bit stream $I_1$. Similarly, the demapper 275B may demap the modified signal $w_2$ to obtain a second bit stream that represents an estimate of the bit stream $I_2$.

The bit combiner 280 may combine (multiplex) the first and second bit streams to obtain a combined bit stream. The deinterleaver 285 may deinterleave each block of the combined bit stream to obtain a deinterleaved bit stream. (The deinterleaver may be configured to invert the action of the transmitter's interleaver 210.) The FEC decoder 290 may decode the deinterleaved bit stream to obtain a decoded bit stream. (The FEC decoder 290 may be configured to invert, or at least to approximate an inverse of, the encoding action of FEC encoder 205.) The decoded bit stream may represent an estimate of the original bit stream supplied to the transmitter's FEC encoder 205.

Mixers 267A-B, transform unit 270, demappers 275A and 275B, bit combiner 280, deinterleaver 285 and decoder 290 may be implemented in any of various forms, e.g., in terms of any of or any combination of the following: custom-designed digital circuitry such as one or more ASICs; one or more programmable processors configured to execute program instructions; and one or more programmable hardware elements such as field programmable gate arrays (FPGAs).

In some embodiments, OFDM may be used as the multiplexing scheme, in which case the mixers 267A and 267B may be replaced by corresponding FFT units; transform unit 270 may be configured to perform a separate matrix-vector multiplication $(U^*_j)y(j,k)$ for each carrier frequency $\omega_j$; and demappers 275A and 275B may be interpreted as OFDM demappers.

Figure 8C:
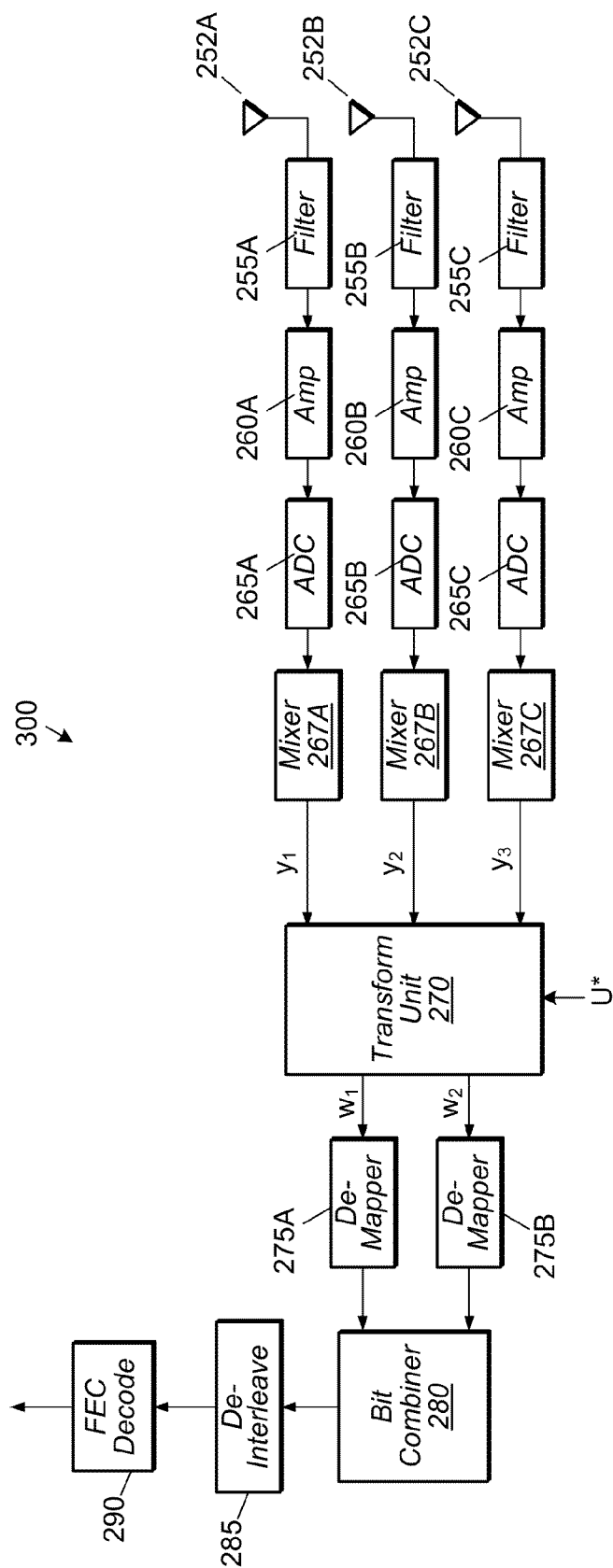
FIG. 8C illustrates one embodiment of a receiver that may be used as part of a 2×3 MIMO system.

FIG. 8C shows one embodiment of a receiver 300 that might be used as part of a 2×3 MIMO system in conjunction with the transmitter of FIG. 8A. The receiver 300 includes an additional input path including input port 252C, filter 255C, amplifier 260C, ADC 265C and mixer 267C. (The input ports 252A-C are configured to couple to the power distribution network so as to receive three of the four signals in the above-described set $Z_4$.) Each of the elements in this additional input path may be configured to behave similarly to the corresponding element of the first input path or the second input path. Thus, mixer 267C may produce a third signal $y_3$, which, along with signals $y_1$ and $y_2$, form the vector signal $y=[y_1,y_2,y_3]^T$. Transform unit 270 may multiply the vector signal y by the matrix U* as described above. In this case, the matrix U* is a 2×3 matrix.

Furthermore, in some embodiments, receiver 300 may be configured to perform OFDM demodulation. In these embodiments, the mixers 267A-C may be replaced with corresponding FFT units; transform unit 270 may be configured to perform a separate matrix-vector multiplication $(U^*_j)y(j,k)$ for each carrier frequency $\omega_j$; and demappers 275A and 275B may be interpreted as OFDM demappers.

Figure 8D:
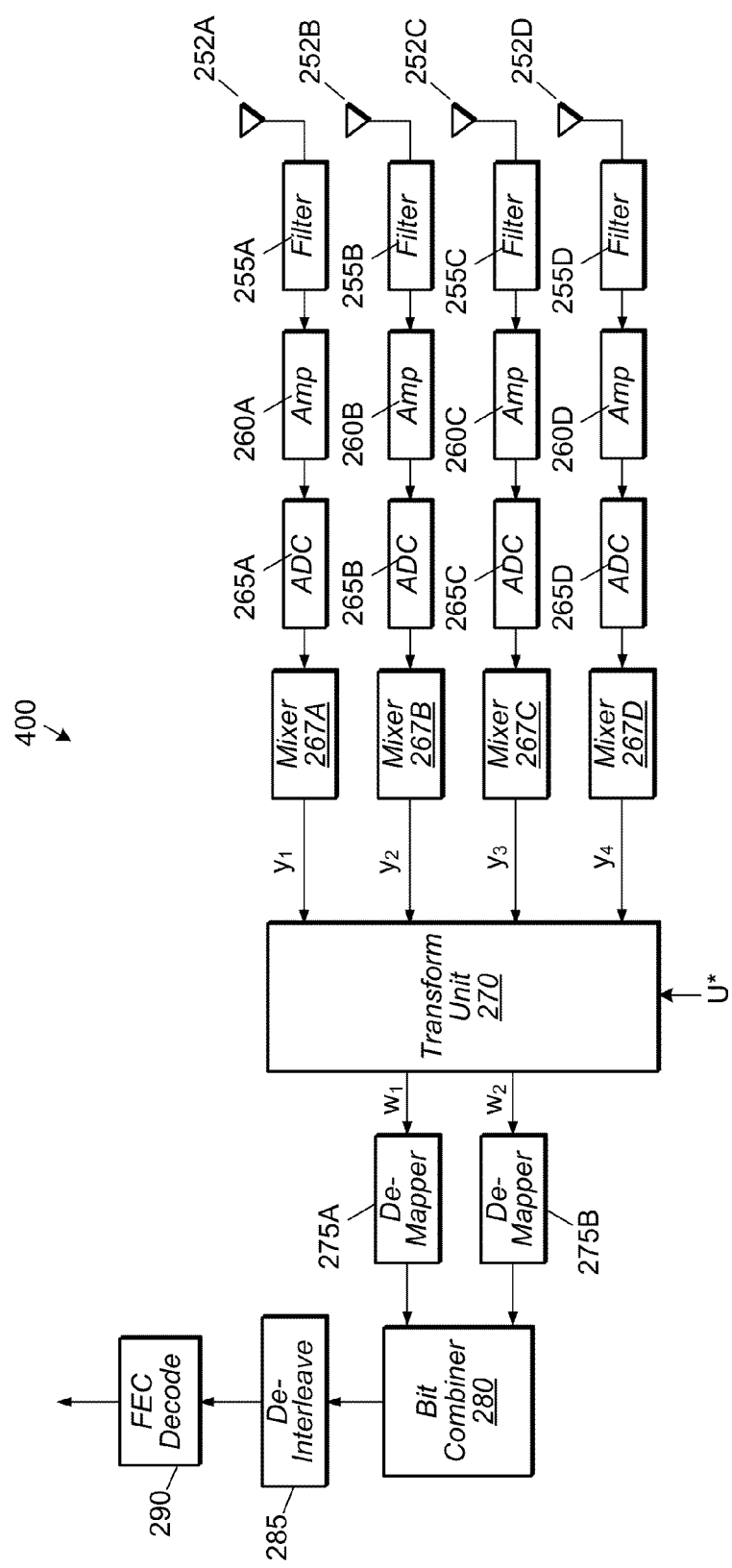
FIG. 8D illustrates one embodiment of a receiver that may be used as part of a 2×4 MIMO system.

FIG. 8D shows one embodiment of a receiver 400 that might be used as part of a 2×4 MIMO system in conjunction with the transmitter of FIG. 8A. The receiver 400 includes a fourth input path. The fourth input path includes input port 252D, filter 255D, amplifier 260D, ADC 265D and mixer 267D. (The input ports 252A-D are configured to couple to the power distribution network so as to receive all four of the signals in the above-described set $Z_4$.) Each of the elements in this fourth input path may be configured to behave similarly to the corresponding element of the first input path or the second input path or the third input path. Thus, mixer 267D may produce a fourth signal $y_4$, which, along with signals $y_1$ through $y_3$, form the vector signal $y=[y_1,y_2,y_3,y_4]^T$. Transform unit 270 may multiply the vector signal y by the matrix U* as described above. In this case, the matrix U* is a 2×4 matrix.

Furthermore, in some embodiments, receiver 400 may be configured to perform OFDM demodulation. In these embodiments, the mixers 267A-D may be replaced with corresponding FFT units; transform unit 270 may be configured to perform a separate matrix-vector multiplication $(U^*_j)y(j,k)$ for each carrier frequency $\omega_j$; and demappers 275A and 275B may be interpreted as OFDM demappers.

Spot Beamforming

In one set of embodiments, a method 900 for operating a transmitter may involve the operations shown in FIG. 9. The method 900 may be used to transmit information through a powerline medium that includes at least three conductors. (Furthermore, the method 900 may include any subset of the various embodiments, features, elements, and operations described above.) In some embodiments, the method 900 may be performed by a computational device (or computer system) as described above. In some embodiments, the method 900 may be performed by system 1000 described below.

At 910, a power adjustment factor α may be determined (e.g., as variously described above) based on data including channel-descriptive information. The channel-descriptive information includes a channel estimate or parameters derived from the channel estimate. The channel estimate is an estimate of a channel between two or more inputs of the powerline medium and one or more outputs of the powerline medium. (The channel estimate may be the matrix $H_{est}$ described above.) The inputs of the powerline medium correspond to conductor pairs of the powerline medium, e.g., at a first access point of the powerline medium. The outputs of the powerline medium may correspond to conductor pairs of the powerline medium, e.g., at a second access point of the powerline medium. As described above, one of the outputs may be the common mode voltage.

In some embodiments, the channel estimate or the parameters derived from the channel estimate may be received from a receiver through the powerline medium.

In some embodiments, the parameters include a first angle and a second angle (e.g., the angles θ and φ described above) that characterize the precoding matrix as variously described above. Methods for computing the first and second angle from the precoding matrix or from the matrix $H_{est}$ are well known. In one embodiment, the first and second angles are received from the receiver through the powerline medium.

In some embodiments, the parameters include a magnitude and a phase that characterize the precoding matrix, e.g., as variously described above. Methods for computing the magnitude and phase from the unitary precoding matrix or from the matrix $H_{est}$ are well known.

In some embodiments, the parameters include the components of the precoding matrix.

In some embodiments, the data used to determine the adjustment factor α also includes an average power of the symbol stream.

In some embodiments, the data used to determine the adjustment factor α also includes measured impedance values of the wire pairs in the powerline medium.

At 915, a symbol s of a symbol stream may be operated on (linearly transformed) in order to obtain two or more transmit values, e.g., the transmit values $x_1(k)$ and $x_2(k)$ described above. The transmit values are complex number values. The symbol stream is determined by a stream of information bits. The action of operating on the symbol s includes computing a transmit vector x by multiplying the symbol s by the power adjustment factor α and by a vector c. The phrase "multiplying the symbol s by the power adjustment factor α and by a vector c" is meant to encompass within its scope of meaning all possible algebraically-equivalent ways of generating the triple product αsc, e.g., ways such as:

$$x=(\alpha s)c,$$

$$x=\alpha(sc),$$

$$x=(\alpha c)s.$$

The vector c is a column of a precoding matrix (e.g., the unitary precoding matrix V as variously described above). The precoding matrix is derived from the channel estimate, e.g., as variously described above. The two or more transmit values are specified by respective components of the transmit vector x.

At 920, the two or more transmit values may be transmitted, respectively, through the two or more inputs of the powerline medium, e.g., as variously described above. The power adjustment factor α is determined so that the power (e.g., the average or peak power over multiple repetitions of the transmission sequence comprising actions 915 and 920) transmitted into the powerline medium is set to a predetermined value. In some embodiments, the predetermined value is selected to ensure that the power radiated from the powerline medium in response to the multiple repetitions of the transmission sequence is within (does not exceed) a regulatory limit. In some embodiments, the predetermined value is selected to ensure that the power conducted (injected) into the powerline medium in response to the multiple repetitions of the transmission sequence is within (does not exceed) a regulatory limit.

In some situations, the power adjustment factor $\alpha$ is greater than one, implying that the transmit power of the symbol stream is scaled up (increased). In other situations, the power adjustment factor $\alpha$ is positive and less than one, implying that the transmit power of the symbol stream is scaled down (decreased).

In some embodiments, the powerline medium includes exactly three conductors, where the number of said two or more inputs is two, e.g., as described above.

In some embodiments, the precoding matrix is (or corresponds to) the matrix V in a singular value decomposition UDV* of the channel estimate. The singular value decomposition may be computed by the transmitter or by the receiver. In one embodiment, the matrix V may be computed directly from the channel estimate (i.e., the matrix $H_{est}$) without performing an SVD.

In some embodiments, the method 900 also includes generating the channel estimate, or, receiving the channel estimate (or some portion of the channel estimate) from a receiver through the powerline medium.

In some embodiments, the power adjustment factor may be determined from the above-described data by evaluating an algebraic expression, or perhaps by performing a table lookup, e.g., as variously described above.

Figure 10:
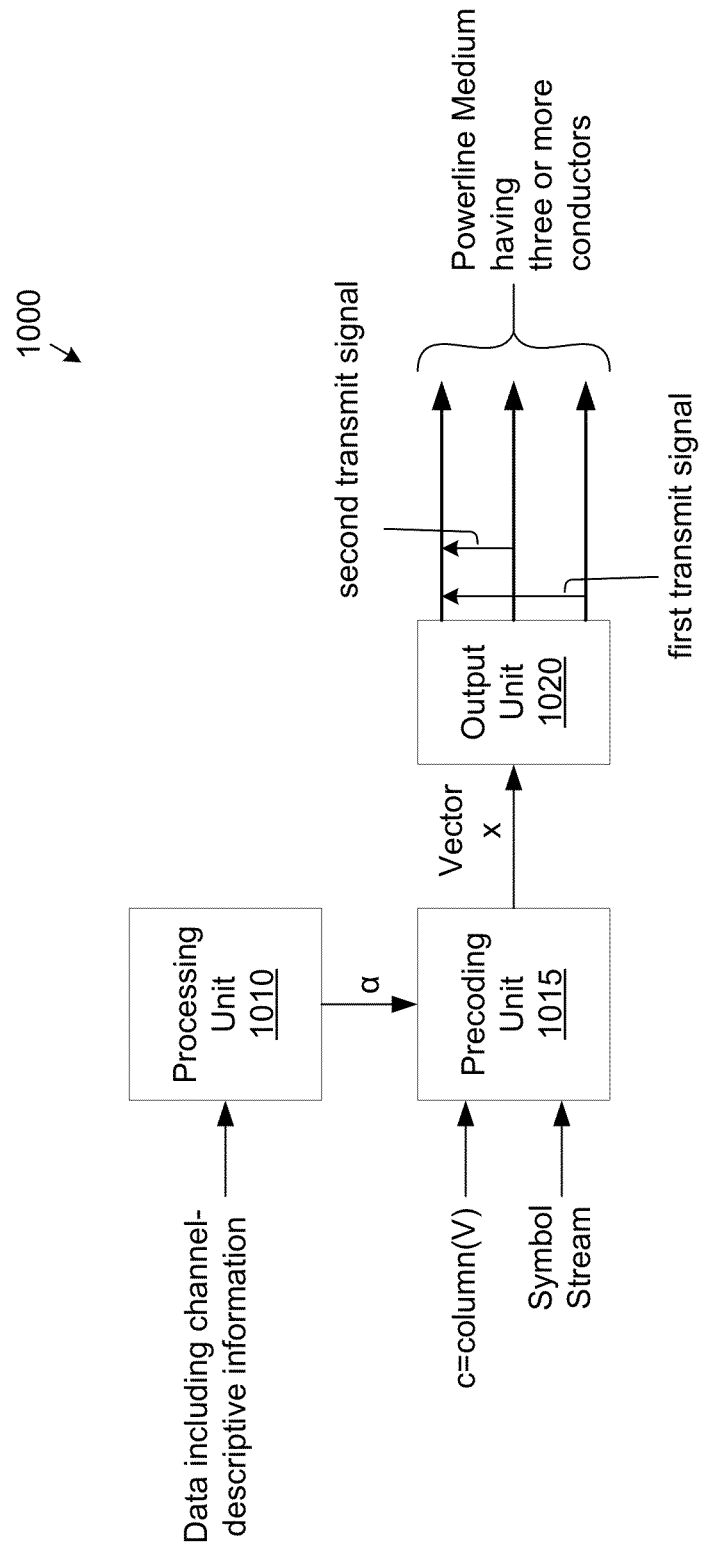
FIG. 10 illustrates one embodiment of a system for performing spot beamforming on transmitted signals.

In one set of embodiments, a system 1000 may be configured as shown in FIG. 10. The system 1000 may be configured for transmitting information through a powerline medium that includes at least three conductors. The system 1000 may include a processing unit 1010, a precoding unit 1015 and an output unit 1020. (Furthermore, system 1000 may include any subset of the embodiments, features, elements and operations described above.)

The processing unit 1010 may be configured to determine a power adjustment factor $\alpha$ based on data including channel-descriptive information. The channel-descriptive information includes a channel estimate or parameters derived from the channel estimate. The channel estimate is an estimate of a channel between two or more inputs of the powerline medium and one or more outputs of the powerline medium, e.g., as variously described above.

The precoding unit 1015 may be configured to operate on (linearly transform) a symbol s of a symbol stream to obtain two or more transmit values. The transmit values are complex number values. The symbol stream is determined by a stream of information bits (e.g., by a mapping unit as described above). The action of operating on the symbol s may include computing a transmit vector x by multiplying the symbol s by the power adjustment factor $\alpha$ and by a vector c. The vector c is a column of a precoding matrix (e.g., the unitary precoding matrix V as described above). The precoding matrix is derived from the channel estimate, e.g., the matrix $H_{est}$ described above. The two or more transmit values are specified by respective components of the transmit vector x.

The output unit 1020 may be configured to transmit the two or more transmit values, respectively, through the two or more inputs of the powerline medium, e.g., as variously described above. The power adjustment factor $\alpha$ is determined so that power transmitted into the powerline medium (e.g., the average power transmitted into the powerline medium over multiple repetitions of the transmission sequence including the precoding unit's action of operating on a symbol s and the output unit's action of transmitting the two or more transmit values) is set to a predetermined value. In some embodiments, the predetermined value is selected to ensure that power radiated in response to the multiple repetitions of the transmission sequence does not exceed a regulatory limit, e.g., as variously described above.

The output unit may include two or more parallel output paths, each output path responsible for generating a corresponding transmit signal based at least in part on a corresponding one of the transmit values. Each output path may include elements such as a digital-to-analog converter, a low-pass filter and an output amplifier, and in some alternative embodiments, also a mixer.

For the sake of discussion, FIG. 10 shows a powerline medium with three conductors. However, more generally, the powerline medium may include three or more conductors. The number of signals transmitted onto the powerline medium may be greater than or equal to two, and up to one less than the number of conductors. Each of the two or more transmit values is transmitted via a respective one of the transmit signals.

The processing unit 1010, the precoding unit 1015, and at least a portion of the output unit 1020 may be realized by digital circuits, e.g., by a microprocessor (or system of interconnected microprocessors), a programmable hardware element such as a field-programmable gate array (FPGA), an application specific integrated circuit (ASIC), or any combination such elements. In one embodiment that involves determining the adjustment factor by table lookup, the processing unit 1010 includes memory for storing the lookup table and associated logic for accessing the table.

In some embodiments, the powerline medium includes exactly three conductors, and the number of inputs to the powerline medium is two (i.e., the transmitter transmits on exactly two of the three conductor pairs).

In some embodiments, the precoding matrix is the matrix V in a singular value decomposition UDV* of the channel estimate. In one embodiment, the system 1000 (e.g., the processing unit 1010) may be configured to perform the singular value decomposition. In other embodiments, the matrix V or an encoded representation of the matrix V may be received from a receiver through the powerline medium.

In some embodiments, the output unit 1020 may be configured to transmit the two or more transmit values by incorporating each of the two or more transmit values into a corresponding one of two or more orthogonal frequency division multiplexing (OFDM) signals, and transmitting the two or more OFDM signals, respectively, through the two or more inputs of the powerline medium, e.g., as described above. In these embodiments, output unit 1020 may include two or more parallel OFDM units, or perhaps, one OFDM unit that is time shared. Each OFDM unit may include digital circuitry for performing an IFFT.

Eigen Beamforming

In one set of embodiments, a method 1100 for operating a transmitter may involve the operations shown in FIG. 11. The method 1100 may be used to transmit information through a powerline medium that includes at least three conductors. (Furthermore, the method 1100 may include any subset of the various embodiments, features, elements, and operations described above.) In some embodiments, the method 1100 may be performed by a computational device (or computer system) as described above. In other embodiments, the method 1100 may be performed by system 1200 as described below.

At 1110, a power adjustment factor α may be determined (e.g., as variously described above) based on data including channel-descriptive information. The channel-descriptive information includes a channel estimate or parameters derived from the channel estimate, e.g., as variously described above. The channel estimate is an estimate of a channel between two or more inputs of the powerline medium and one or more outputs of the powerline medium. The channel estimate may be the matrix $H_{est}$ described above.

In some embodiments, the channel estimate or the parameters derived from the channel estimate may be received from a receiver through the powerline medium.

In some embodiments, the parameters include a first angle and a second angle (e.g., the angles θ and φ described above) that characterize the precoding matrix, as variously described above. Methods for computing the first and second angle from the precoding matrix or from the matrix $H_{est}$ are well known. In one embodiment, the first and second angles are received from a receiver through the powerline medium.

In some embodiments, the parameters include a magnitude and a phase that characterize the precoding matrix, e.g., as variously described above. Methods for computing the magnitude and phase from the precoding matrix or from the matrix $H_{est}$ are well known.

In some embodiments, the parameters include the components of the precoding matrix.

In some embodiments, the data used to determine the power adjustment factor α also includes measured impedance values of wire pairs in the powerline medium.

In some embodiments, the data used to determine the adjustment factor α also includes a power allocation parameter, where the power allocation parameter determines an amount of said transmitted power that is allocated to the first symbol stream vs. the second symbol stream. The power allocation parameter may itself be determined by the eigenvalues of the channel, i.e., the diagonal entries of the matrix D described above.

At 1115, a symbol vector may be operated on (linearly transformed) to obtain two or more transmit values. The transmit values are complex number values. The symbol vector includes at least a first symbol from a first symbol stream and a second symbol from a second symbol stream. The first and second symbol streams are determined by an information bit stream, e.g., as variously described above. The action of operating on the symbol vector includes computing a transmit vector x by multiplying the symbol vector by the power adjustment factor α and by a precoding matrix, e.g., as variously described above. The phrase "multiplying the symbol vector by the power adjustment factor α and by a precoding matrix" is meant to encompass within its scope of meaning all possible algebraically-equivalent ways of generating the triple product αVS, where V is the precoding matrix and where S is the symbol vector, e.g., ways such as:

$x=(\alpha V)S$, $x=\alpha(VS)$, $x=V(\alpha S)$.

The precoding matrix is derived from the channel estimate. The two or more transmit values are specified by respective components of the transmit vector x.

In some embodiments, the transmitter may be configured to transmit two or more symbol streams. Thus, the symbol vector S may include two or more symbols, i.e., one symbol per symbol stream. For example, the total number $n_s$ of symbol streams being transmitted may be less than or equal to the number of non-zero channel eigenvalues.

At 1120, the two or more transmit values may be transmitted, respectively, through the two or more inputs of the powerline medium. The power adjustment factor α is determined so that power transmitted into the powerline medium (i.e., the average or peak power transmitted into the powerline medium over multiple repetitions of the transmission sequence comprising actions 1115 and 1120) is set to a predetermined value. In some embodiments, the predetermined value is selected to ensure that power radiated from the powerline medium in response to the multiple repetitions of the transmission sequence does not exceed a regulatory limit. In some embodiments, the predetermined value is selected to ensure that the power conducted (injected) into the powerline medium in response to the multiple repetitions of the transmission sequence is within (does not exceed) a regulatory limit.

In some situations, the power adjustment factor α is greater than one, implying that the power of the first symbol stream and the power of the second symbol stream are scaled up (increased). In other situations, the power adjustment factor α is less than one (but positive), implying that the power of the first symbol stream and the power of the second symbol stream are scaled down (decreased).

In some embodiments, the powerline medium includes exactly three conductors, and the total number of the two or more inputs to the powerline medium is two.

In some embodiments, the precoding matrix is the unitary matrix V in a singular value decomposition UDV* of the channel estimate. The singular value decomposition may be computed by the transmitter or by the receiver. In one embodiment, the matrix V may be computed directly from the channel estimate (i.e., the matrix $H_{est}$) without performing an SVD.

In some embodiments, the method 1100 also includes generating the channel estimate, or, receiving the channel estimate (or some portion of the channel estimate) from a receiver through the powerline medium.

Figure 12:
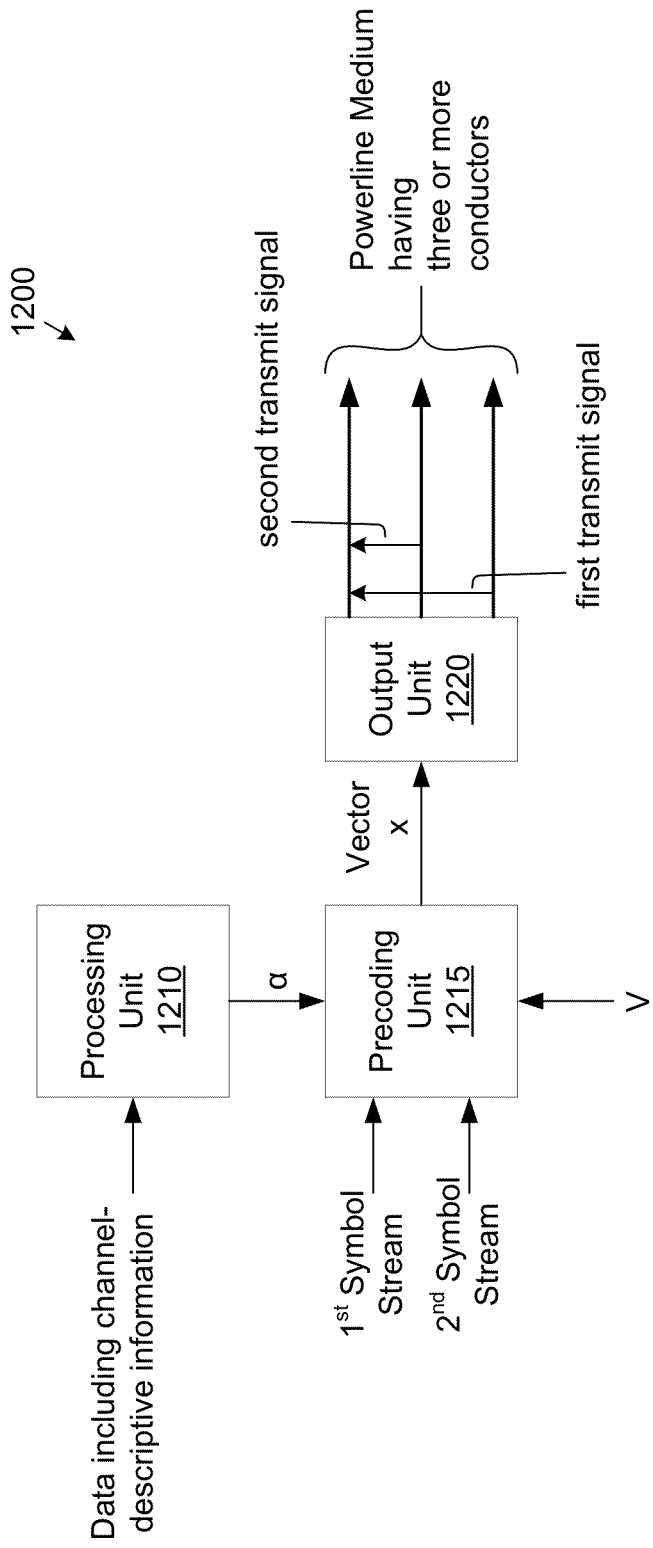
FIG. 12 illustrates one embodiment of a system for performing eigen beamforming on transmitted signals.

In one set of embodiments, a system 1200 may be configured as shown in FIG. 12. The system 1200 may be configured for transmitting information through a powerline medium that includes at least three conductors. The system 1200 includes a processing unit 1210, a precoding unit 1215 and an output unit 1220. (Furthermore, system 1200 may include any subset of the embodiments, features, elements and operations described above.)

The processing unit 1210 may be configured to determine a power adjustment factor α based on data including channel-descriptive information, e.g., as variously described above. The channel-descriptive information includes a channel estimate or parameters derived from the channel estimate. The channel estimate is an estimate of a channel between two or more inputs of the powerline medium and one or more outputs of the powerline medium.

In some embodiments, the data used to determine the power adjustment factor α also includes a power allocation parameter, where the power allocation parameter determines an amount of the transmitted power that is allocated to the first symbol stream versus the second symbol stream.

In some embodiments, the data used to determine the power adjustment factor α also includes measured impedance values of wire pairs in the powerline medium. The system 1200 may include circuitry for performing the impedance measurements.

The precoding unit 1215 may be configured to operate on a symbol vector to obtain two or more transmit values, e.g., as variously described above. The transmit values are complex number values. The symbol vector includes at least a first symbol from a first symbol stream and a second symbol from a second symbol stream. The first and second symbol streams are determined by an information bit stream, e.g., as variously described above. The action of operating on the symbol vector includes computing a transmit vector x by multiplying the symbol vector by the power adjustment factor $\alpha$ and by a precoding matrix. The precoding matrix is derived from the channel estimate, e.g., as variously described above. The two or more transmit values are specified by respective components of the transmit vector x.

The output unit 1220 may be configured to transmit the two or more transmit values, respectively, through the two or more inputs of the powerline medium. The power adjustment factor $\alpha$ is determined so that power transmitted into the powerline medium (e.g., the average or peak power transmitted into the powerline medium over multiple repetitions of the transmission sequence including the precoding unit's action of operating on a symbol vector and the output unit's action of transmitting the resulting two or more transmit values) is set to a predetermined value. In some embodiments, the predetermined value is selected to ensure that power radiated from the powerline medium in response to the multiple repetitions of the transmission sequence does not exceed a regulatory limit.

For the sake of discussion, FIG. 12 shows a powerline medium with three conductors. However, more generally, the powerline medium may include three or more conductors. The number of signals transmitted onto the powerline medium is greater than or equal to two, and up to one less than the number of conductors.

The processing unit 1210, the precoding unit 1215, and portions of the output unit 1220 may be realized by digital circuits, e.g., by a microprocessor (or system of interconnected microprocessors), a programmable hardware element such as a field-programmable gate array (FPGA), an application specific integrated circuit (ASIC), or any combination such elements. In one embodiment that involves determining the power adjustment factor by table lookup, the processing unit 1210 includes memory for storing the lookup table and associated logic for accessing the table.

In some embodiments, the powerline medium includes exactly three conductors, and the number of inputs to the powerline medium is two (i.e., the transmitter transmits on exactly two of the three possible conductor pairs).

In some embodiments, the precoding matrix is the matrix V in a singular value decomposition UDV* of the channel estimate. In one embodiment, the system 1200 (e.g., the processing unit 1210) may be configured to perform the singular value decomposition. In other embodiments, the matrix V or an encoded representation of the matrix V may be received from a receiver through the powerline medium.

In some embodiments, the output unit 1220 is configured to transmit the two or more transmit values by incorporating each of the two or more transmit values into a corresponding one of two or more orthogonal frequency division multiplexing (OFDM) signals, and transmitting the two or more OFDM signals, respectively, through the two or more inputs of the powerline medium, e.g., as variously described above. In these embodiments, output unit 1220 may include two or more parallel OFDM units, or perhaps, one OFDM unit that is time shared. Each OFDM unit may include digital circuitry for performing an IFFT.

In one set of embodiments, a method 1300 may include the operations shown in FIG. 13. The method 1300 may be employed for transmitting information through a powerline medium that includes at least three conductors. (The method 1300 may also include any subset of the features described above, e.g., in connection with method 900 and/or in connection with method 1100.)

At 1310, a symbol vector may be transformed to obtain two or more transmit values, e.g., as variously described above. The symbol vector includes one or more symbols from one or more corresponding symbol streams. The one or more symbol streams may be determined by corresponding portions (substreams) of an information bit stream. The action of transforming the symbol vector includes computing a transmit vector x by multiplying the symbol vector by a power adjustment factor $\alpha$ and by a matrix G comprising one or more columns of a precoding matrix, e.g., as variously described above. The number of symbols in the symbol vector equals the number of precoding matrix columns in the matrix G. The precoding matrix is derived from a channel estimate, e.g., by performing a singular value decomposition of a matrix representing the channel estimate. The channel estimate is an estimate of a channel between two or more inputs of the powerline medium and one or more outputs of the powerline medium. The power adjustment factor $\alpha$ is determined based on data including channel descriptive information. The channel-descriptive information includes the channel estimate or parameters derived from the channel estimate, e.g., as variously described above. The two or more transmit values are specified by respective components of the transmit vector x.

At 1320, the two or more transmit values may be transmitted onto the powerline medium through the two or more inputs of the powerline medium. The power adjustment factor $\alpha$ is determined so that power transmitted into the powerline medium is set to a predetermined value. In some embodiments, the predetermined value is selected to ensure that power radiated from the powerline medium does not exceed a regulatory limit. In one embodiment, the predetermined value is selected to be equal to a regulatory limit on the power transmitted onto the powerline medium.

The two or more transmit values may be transmitted using any of various modulation schemes. In one embodiment, the two or more transmit values correspond to a particular tone frequency in an OFDM scheme, and each of the two or more transmit values is injected into a respective one of two or more OFDM symbol streams.

In some embodiments, the method 1300 may also comprise determining the power adjustment factor $\alpha$ based on the data, e.g., as variously described above.

In some embodiments, the symbol vector includes only one symbol from one corresponding symbol stream, and the matrix G includes only one column of the precoding matrix, e.g., as described above in connection with FIG. 9.

In some embodiments, the symbol vector includes two or more symbols from two or more corresponding symbol streams, and the matrix G includes two or more columns of the precoding matrix, e.g., as described above in connection with FIG. 11.

In one set of embodiments, a system 1400 may be configured as shown in FIG. 14. The system 1400 may be employed for transmitting information through a powerline medium 1430 that includes at least three conductors. The system 1400 may include a precoding unit 1415 and an output unit 1420. (Furthermore, the system 1400 may include any subset of the features described above, e.g., described above in connection with FIGS. 9-13.)

The precoding unit 1415 may be configured to transform a symbol vector to obtain two or more transmit values, wherein the symbol vector includes one or more symbols from one or more corresponding symbol streams. The one or more symbol streams may be determined by corresponding portions (substreams) of an information bit stream. The action of transforming the symbol vector includes computing a transmit vector x by multiplying the symbol vector by a power adjustment factor α and by a matrix G comprising one or more columns of a precoding matrix. The number of symbols in the symbol vector equals the number of precoding matrix columns in the matrix G. The precoding matrix is derived from a channel estimate, where the channel estimate is an estimate of a channel between two or more inputs of the powerline medium and one or more outputs of the powerline medium. The power adjustment factor α may be determined based on data including channel-descriptive information. The channel-descriptive information includes the channel estimate or parameters derived from the channel estimate, e.g., as variously described above. The two or more transmit values are specified by respective components of the transmit vector x.

The output unit 1420 may be configured to transmit the two or more transmit values onto the powerline medium through the two or more inputs of the powerline medium. The power adjustment factor α may be determined so that power transmitted into the powerline medium is set to a predetermined value.

In some embodiments, the system 1400 may also include a processing unit that is configured to determine the power adjustment factor α based on the data, e.g., as described above in connection with FIG. 10 or in connection with FIG. 12.

The processing unit, the precoding unit 1415, and at least a portion of the output unit 1420 may be realized by digital circuitry, e.g., by a microprocessor (or system of interconnected microprocessors), a programmable hardware element such as a field-programmable gate array (FPGA), an application specific integrated circuit (ASIC), or any combination such elements.

In some embodiments, the output unit may be configured to transmit the two or more transmit values by incorporating each of the two or more transmit values into a corresponding one of two or more orthogonal frequency-division multiplexing (OFDM) signals, and transmitting the two or more OFDM signals, respectively, through the two or more inputs of the powerline medium.

In some embodiments, the symbol vector includes only one symbol from one corresponding symbol stream, and the matrix G includes only one column of the precoding matrix, e.g., as described above in connection with FIG. 10.

In some embodiments, the symbol vector includes two or more symbols from two or more corresponding symbol streams, and the matrix G includes two or more columns of the precoding matrix, e.g., as described above in connection with FIG. 12.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a transmitter in order to transmit information through a powerline medium that includes at least three conductors, the method comprising:

determining a power adjustment factor α based on data including channel-descriptive information, wherein the channel-descriptive information includes a channel estimate or parameters derived from the channel estimate, wherein the channel estimate is an estimate of a channel between two or more inputs of the powerline medium and one or more outputs of the powerline medium;

operating on a symbol s of a symbol stream to obtain two or more transmit values, wherein the symbol stream is determined by a stream of information bits, wherein said operating on the symbol s includes computing a transmit vector x by multiplying the symbol s by the power adjustment factor α and by a vector c, wherein the vector c is a column of a precoding matrix, wherein the precoding matrix is derived from the channel estimate, wherein the two or more transmit values are specified by respective components of the transmit vector x; and transmitting the two or more transmit values, respectively, through the two or more inputs of the powerline medium, wherein the power adjustment factor α is determined so that power transmitted into the powerline medium is set to a predetermined value.

2. The method of claim 1, wherein the power adjustment factor α is greater than one.

3. The method of claim 1, wherein the power adjustment factor α is positive and less than one.

4. The method of claim 1, wherein the powerline medium includes exactly three conductors, where said two or more inputs includes exactly two inputs.

5. The method of claim 1, wherein the predetermined value is selected to ensure that power radiated from the powerline medium does not exceed a regulatory limit.

6. The method of claim 1, wherein the predetermined value is selected to ensure that power transmitted into the powerline medium does not exceed a regulatory limit.

7. The method of claim 1, wherein the precoding matrix is a matrix V in a singular value decomposition UDV* of the channel estimate.

8. The method of claim 1, wherein the parameters derived from the channel estimate include a first angle and second angle that characterize the precoding matrix.

9. The method of claim 1, wherein the parameters derived from the channel estimate include a magnitude and an angle that characterize the precoding matrix.

10. The method of claim 1, wherein the data also includes measured impedance values of wire pairs in the powerline medium.

11. The method of claim 1, wherein the precoding matrix is a unitary matrix.

12. A system for transmitting information through a powerline medium that includes at least three conductors, the system comprising:

a processing unit configured to determine a power adjustment factor α based on data including channel-descriptive information, wherein the channel-descriptive information includes a channel estimate or parameters derived from the channel estimate, wherein the channel estimate is an estimate of a channel between two or more inputs of the powerline medium and one or more outputs of the powerline medium;

a precoding unit configured to operate on a symbol s of a symbol stream to obtain two or more transmit values, wherein the symbol stream is determined by a stream of information bits, wherein said operating on the symbol s includes computing a transmit vector x by multiplying the symbol s by the power adjustment factor α and by a vector c, wherein the vector c is a column of a precoding matrix, wherein the precoding matrix is derived from the channel estimate, wherein the two or more transmit values are specified by respective components of the transmit vector x; and an output unit configured to transmit the two or more transmit values, respectively, through the two or more inputs of the powerline medium, wherein the power adjustment factor $\alpha$ is determined so that power transmitted into the powerline medium is set to a predetermined value.

13. The system of claim 12, wherein the powerline medium includes exactly three conductors, wherein said two or more inputs includes exactly two inputs.

14. The system of claim 12, wherein the predetermined value is selected to ensure that power radiated from the powerline medium does not exceed a regulatory limit.

15. The system of claim 12, wherein the precoding matrix is a matrix V in a singular value decomposition UDV* of the channel estimate.

16. The system of claim 12, wherein the output unit is configured to transmit the two or more transmit values by incorporating each of the two or more transmit values into a corresponding one of two or more orthogonal frequency division multiplexing (OFDM) signals, and transmitting the two or more OFDM signals, respectively, through the two or more inputs of the powerline medium.

17. The system of claim 12, wherein the precoding matrix is a unitary matrix.

18. The system of claim 12, wherein the parameters derived from the channel estimate include a first angle and second angle that characterize the precoding matrix.

19. The system of claim 12, wherein the parameters derived from the channel estimate include a magnitude and an angle that characterize the precoding matrix.

20. The system of claim 12, wherein the data also includes measured impedance values of wire pairs in the powerline medium.

* * * * *